United States Patent
Fukushima

(10) Patent No.: US 9,900,508 B2
(45) Date of Patent: Feb. 20, 2018

(54) IMAGE PICKUP APPARATUS THAT SETS SHUTTER SPEED FOR MOVING IMAGE SHOOTING, METHOD OF CONTROLLING THE SAME, AND STORAGE MEDIUM

(71) Applicant: CANON KABUSHIKI KAISHA, Tokyo (JP)

(72) Inventor: Yuki Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 15/222,220

(22) Filed: Jul. 28, 2016

(65) Prior Publication Data

US 2017/0034440 A1 Feb. 2, 2017

(30) Foreign Application Priority Data

Jul. 31, 2015 (JP) .................. 2015-152049

(51) Int. Cl.
*H04N 5/232* (2006.01)
*H04N 5/235* (2006.01)

(52) U.S. Cl.
CPC ....... *H04N 5/23245* (2013.01); *H04N 5/2353* (2013.01); *H04N 5/23293* (2013.01)

(58) Field of Classification Search
CPC ........... H04N 5/23245; H04N 5/23293; H04N 5/2353; G03B 7/00; G03B 7/003; G03B 7/0807; G03B 7/091; G03B 7/093
See application file for complete search history.

(56) References Cited

U.S. PATENT DOCUMENTS

2008/0297613 A1* 12/2008 Takahashi ............. H04N 5/232
348/221.1

FOREIGN PATENT DOCUMENTS

JP 2008-301286 A 12/2008

* cited by examiner

*Primary Examiner* — Paul Berardesca
(74) *Attorney, Agent, or Firm* — Cowan, Liebowitz & Latman, P.C.

(57) ABSTRACT

An image pickup apparatus capable of setting a shutter speed for moving image shooting up to a speed closer to a long exposure-side limit value irrespective of the setting exposure step increments for setting a shutter speed for still image shooting. Exposure step increments which values of a shutter speed can be set are set to one of a plurality of settings of exposure step increments according to a user's operation. A frame rate of a moving image to be shot is set in the moving image shooting mode. A shutter speed is set based on the set exposure step increments. In the moving image shooting mode, control is performed so as to make it possible to set a shutter speed which is the reciprocal of the set frame rate and does not conform to the set exposure step increments.

12 Claims, 15 Drawing Sheets

FIG. 4A

SETTING OF EXPOSURE STEP INCREMENTS

SHUTTER SPEED 1/3, EXPOSURE CORRECTION 1/3, 1/3

SHUTTER SPEED 1, EXPOSURE CORRECTION 1/3, 1/1

SHUTTER SPEED 1/2, EXPOSURE CORRECTION 1/2, 1/2

INFO. HELP

FIG. 4B

MOVING IMAGE RECORDING SIZE

1920x1080    25fps    04:41
LOW COMPRESSION(ALL-I)

| 1920 | 25 | ALL-I |    | 1280 | 50 | ALL-I |
| 1920 | 25 | IPB   |    | 1280 | 50 | IPB   |
| 1920 | 24 | ALL-I |    | 640  | 25 | IPB   |
| 1920 | 24 | IPB   |

FIG. 5A

| NO. | 1/3 STOP |
|---|---|
| 0(N_Min) | 30 SEC |
| 1 | 25 SEC |
| 2 | 20 SEC |
| 3 | 15 SEC |
| 4 | 13 SEC |
| 5 | 10 SEC |
| 6 | 8 SEC |
| 7 | 6 SEC |
| 8 | 5 SEC |
| 9 | 4 SEC |
| 10 | 3.2 SEC |
| 11 | 2.5 SEC |
| 12 | 2 SEC |
| 13 | 1.6 SEC |
| 14 | 1.3 SEC |
| 15 | 1 SEC |
| 16 | 0.8 SEC |
| 17 | 0.6 SEC |
| 18 | 0.5 SEC |
| 19 | 0.4 SEC |
| 20 | 0.3 SEC |
| 21 | 1/4 SEC |
| 22 | 1/5 SEC |
| 23 | 1/6 SEC |
| 24 | 1/8 SEC |
| 25 | 1/10 SEC |
| 26 | 1/13 SEC |
| 27 | 1/15 SEC |
| 28 | 1/20 SEC |
| 29 | 1/25 SEC |
| 30 | 1/30 SEC |
| 31 | 1/40 SEC |
| 32 | 1/50 SEC |
| 33 | 1/60 SEC |
| 34 | 1/80 SEC |
| 35 | 1/100 SEC |
| 36 | 1/125 SEC |
| 37 | 1/160 SEC |
| 38 | 1/200 SEC |
| 39 | 1/250 SEC |
| 40 | 1/320 SEC |
| 41 | 1/400 SEC |
| 42 | 1/500 SEC |
| 43 | 1/640 SEC |
| 44 | 1/800 SEC |
| 45 | 1/1000 SEC |
| 46 | 1/1250 SEC |
| 47 | 1/1600 SEC |
| 48 | 1/2000 SEC |
| 49 | 1/2500 SEC |
| 50 | 1/3200 SEC |
| 51 | 1/4000 SEC |
| 52 | 1/5000 SEC |
| 53 | 1/6400 SEC |
| 54(N_Max) | 1/8000 SEC |

FIG. 5B

| NO. | 1/2 STOP |
|---|---|
| 0(N_Min) | 30 SEC |
| 1 | 20 SEC |
| 2 | 15 SEC |
| 3 | 10 SEC |
| 4 | 8 SEC |
| 5 | 6 SEC |
| 6 | 4 SEC |
| 7 | 3 SEC |
| 8 | 2 SEC |
| 9 | 1.5 SEC |
| 10 | 1 SEC |
| 11 | 0.7 SEC |
| 12 | 0.5 SEC |
| 13 | 0.3 SEC |
| 14 | 1/4 SEC |
| 15 | 1/6 SEC |
| 16 | 1/8 SEC |
| 17 | 1/10 SEC |
| 18 | 1/15 SEC |
| 19 | 1/20 SEC |
| 20 | 1/30 SEC |
| 21 | 1/45 SEC |
| 22 | 1/60 SEC |
| 23 | 1/90 SEC |
| 24 | 1/125 SEC |
| 25 | 1/180 SEC |
| 26 | 1/250 SEC |
| 27 | 1/350 SEC |
| 28 | 1/500 SEC |
| 29 | 1/750 SEC |
| 30 | 1/1000 SEC |
| 31 | 1/1500 SEC |
| 32 | 1/2000 SEC |
| 33 | 1/3000 SEC |
| 34 | 1/4000 SEC |
| 35 | 1/6000 SEC |
| 36(N_Max) | 1/8000 SEC |

FIG. 5C

| NO. | 1 STOP |
|---|---|
| 0(N_Min) | 30 SEC |
| 1 | 15 SEC |
| 2 | 8 SEC |
| 3 | 4 SEC |
| 4 | 2 SEC |
| 5 | 1 SEC |
| 6 | 0.5 SEC |
| 7 | 1/4 SEC |
| 8 | 1/8 SEC |
| 9 | 1/15 SEC |
| 10 | 1/30 SEC |
| 11 | 1/60 SEC |
| 12 | 1/125 SEC |
| 13 | 1/250 SEC |
| 14 | 1/500 SEC |
| 15 | 1/1000 SEC |
| 16 | 1/2000 SEC |
| 17 | 1/4000 SEC |
| 18(N_Max) | 1/8000 SEC |

FIG. 11

| NO. | 1/4 STOP |
|---|---|
| 0(N_Min) | 1/25 SEC |
| 1 | 1/29 SEC |
| 2 | 1/33 SEC |
| 3 | 1/40 SEC |
| 4 | 1/50 SEC |
| 5 | 1/60 SEC |
| 6 | 1/75 SEC |
| 7 | 1/90 SEC |
| 8 | 1/100 SEC |
| 9 | 1/120 SEC |
| 10 | 1/150 SEC |
| 11 | 1/180 SEC |
| 12 | 1/210 SEC |
| 13 | 1/250 SEC |
| 14 | 1/300 SEC |
| 15 | 1/350 SEC |
| 16 | 1/400 SEC |
| 17 | 1/500 SEC |
| 18 | 1/600 SEC |
| 19 | 1/700 SEC |
| 20 | 1/800 SEC |
| 21 | 1/1000 SEC |
| 22 | 1/1200 SEC |
| 23 | 1/1400 SEC |
| 24 | 1/1600 SEC |
| 25(N_Max) | 1/2000 SEC |

IMAGE PICKUP APPARATUS THAT SETS SHUTTER SPEED FOR MOVING IMAGE SHOOTING, METHOD OF CONTROLLING THE SAME, AND STORAGE MEDIUM

BACKGROUND OF THE INVENTION

Field of the Invention

The present invention relates to an image pickup apparatus, a method of controlling the same, and a storage medium, and more particularly to a method of setting a shutter speed for still image shooting and moving image recording.

Description of the Related Art

Conventionally, in an image pickup apparatus, such as a digital camera, a shutter speed can be set and changed in increments associated with exposure stops (exposure steps) e.g. within a range of $1/8000$ to 30 seconds.

For example, in setting a shutter speed, as a method of facilitating shutter speed setting by associating a frame rate of a moving image with the shutter speed, there has been proposed a method of determining a frame rate based on a shutter speed set for still image shooting (see Japanese Patent Laid-Open Publication No. 2008-301286).

Incidentally, the shutter speed for moving image shooting (pickup) cannot be set to be longer than the reciprocal of the frame rate (time required to pick up one frame of a moving image). That is, a lower limit value (long exposure-side limit value) of the shutter speed in moving image shooting is the reciprocal of the frame rate.

However, in a case where exposure step increments are $1/2$-stop increments or 1-stop increments, there is a case where a value close to the reciprocal of the frame rate cannot be found in values which can be set as exposure values. For example, when the frame rate is 25 fps, the lower limit value (long exposure-side limit value) of the shutter speed for moving image shooting is $1/25$ seconds. However, when the exposure step increments are $1/2$-stop increments, there is no setting value of $1/25$ seconds, and a settable value which is shorter than the $1/25$ seconds and is closest to $1/25$ seconds is $1/30$ seconds.

Therefore, even when a user desires to set the shutter speed to as slow a value as possible, the shutter speed cannot be set up to the lower limit (long exposure-side limit value) of the shutter speed for moving image shooting. That is, a shutter speed which is slightly shorter than the lower limit value is a limit to which the shutter speed can be set.

SUMMARY OF THE INVENTION

The present invention provides an image pickup apparatus that is capable of setting a shutter speed for moving image shooting up to a speed closer to a long exposure-side limit value irrespective of the setting of exposure step increments for setting a shutter speed for still image shooting, a method of controlling the same, and a storage medium.

In a first aspect of the present invention, there is provided an image pickup apparatus comprising a mode setting unit configured to set one of a plurality of image shooting modes including a moving image shooting mode and a still image shooting mode, an exposure step increment-setting unit configured to set a setting of exposure step increments with which values of a shutter speed can be set, to one of a plurality of settings of exposure step increments, according to a user's operation, a frame rate-setting unit configured to set a frame rate of a moving image to be shot in the moving image shooting mode, a shutter speed-setting unit configured to set a shutter speed based on the setting of exposure step increments set by the exposure step increment-setting unit, and a control unit configured to perform, in a case of the moving image shooting mode, control such that the shutter speed can be set to a value which is the reciprocal of the frame rate set by the frame rate-setting unit and does not conform to the setting of exposure step increments set by the exposure step increment-setting unit.

In a second aspect of the present invention, there is provided an image pickup apparatus comprising a mode setting unit configured to set one of a plurality of image shooting modes including a moving image shooting mode and a still image shooting mode, an exposure step increment-setting unit configured to set a setting of exposure step increments with which values of a shutter speed can be set, to one of a plurality of settings of exposure step increments, according to a user's operation, a frame rate-setting unit configured to set a frame rate of a moving image to be shot in the moving image shooting mode, and a shutter speed-setting unit configured to set, in a case of the still image shooting mode, the shutter speed based on the setting of exposure step increments set by the exposure step increment-setting unit, and in a case of the moving image shooting mode, the shutter speed not based on the setting of exposure step increments set by the exposure step increment-setting unit, but based on a setting of exposure step increments with which values of the shutter speed, including a value of the reciprocal of the frame rate set by the frame rate-setting unit, can be set.

In a third aspect of the present invention, there is provided a method of controlling an image pickup apparatus, comprising setting one of a plurality of image shooting modes including a moving image shooting mode and a still image shooting mode, setting a setting of exposure step increments with which values of a shutter speed can be set, to one of a plurality of settings of exposure step increments, according to a user's operation, setting a frame rate of a moving image to be shot in the moving image shooting mode, setting a shutter speed based on the set setting of exposure step increments, and performing, in a case of the moving image shooting mode, control such that the shutter speed can be set to a value which is the reciprocal of the set frame rate and does not conform to the set setting of exposure step increments.

In a fourth aspect of the present invention, there is provided a method of controlling an image pickup apparatus, comprising setting one of a plurality of image shooting modes including a moving image shooting mode and a still image shooting mode, setting a setting of exposure step increments with which values of a shutter speed can be set, to one of a plurality of settings of exposure step increments, according to a user's operation, setting a frame rate of a moving image to be shot in the moving image shooting mode, and setting, in a case of the still image shooting mode, the shutter speed based on the set setting of exposure step increments, and in a case of the moving image shooting mode, the shutter speed not based on the set setting of exposure step increments, but based on a setting of exposure step increments with which values of the shutter speed, including a value of the reciprocal of the set frame rate, can be set.

In a fifth aspect of the present invention, there is provided a non-transitory computer-readable storage medium storing a computer-executable program for executing a method of controlling an image pickup apparatus, wherein the method comprises setting one of a plurality of image shooting modes including a moving image shooting mode and a still image shooting mode, setting a setting of exposure step increments with which values of a shutter speed can be set, to one of a plurality of settings of exposure step increments, according to a user's operation, setting a frame rate of a moving image to be shot in the moving image shooting mode, setting a shutter speed based on the set setting of exposure step increments, and performing, in a case of the moving image shooting mode, control such that the shutter speed can be set to a value which is the reciprocal of the set frame rate and does not conform to the set setting of exposure step increments.

In a sixth aspect of the present invention, there is provided a non-transitory computer-readable storage medium storing a computer-executable program for executing a method of controlling an image pickup apparatus, wherein the method comprises setting one of a plurality of image shooting modes including a moving image shooting mode and a still image shooting mode, setting a setting of exposure step increments with which values of a shutter speed can be set, to one of a plurality of settings of exposure step increments, according to a user's operation, setting a frame rate of a moving image to be shot in the moving image shooting mode, and setting, in a case of the still image shooting mode, the shutter speed based on the set setting of exposure step increments, and in a case of the moving image shooting mode, the shutter speed not based on the set setting of exposure step increments, but based on a setting of exposure step increments with which values of the shutter speed, including a value of the reciprocal of the set frame rate, can be set.

According to the present invention, it is possible to set a value closer to the long exposure-side limit value as the shutter speed for moving image shooting, irrespective of the setting of exposure step increments for setting a shutter speed for still image shooting.

Further features of the present invention will become apparent from the following description of exemplary embodiments (with reference to the attached drawings).

BRIEF DESCRIPTION OF THE DRAWINGS

FIG. 4A is a diagram useful in explaining an exposure step increment-setting screen which is displayed on a display section appearing in FIG. 1.

FIG. 4B is a diagram useful in explaining a moving image recording size-setting screen which is displayed on the display section.

FIG. 5A is a diagram showing a list of setting values of the shutter speed in ⅓-stop increments, which can be set from the exposure step increment-setting screen.

FIG. 5B is a diagram showing a list of setting values of the shutter speed in ½-stop increments, which can be set from the exposure step increment-setting screen.

FIG. 5C is a diagram showing a list of setting values of the shutter speed in 1-stop increments, which can be set from the exposure step increment-setting screen.

FIG. 11 is a diagram showing an example of a table used for changing the shutter speed in ¼-stop increments.

DESCRIPTION OF THE EMBODIMENTS

The present invention will now be described in detail below with reference to the accompanying drawings showing embodiments thereof.

Figure 1:
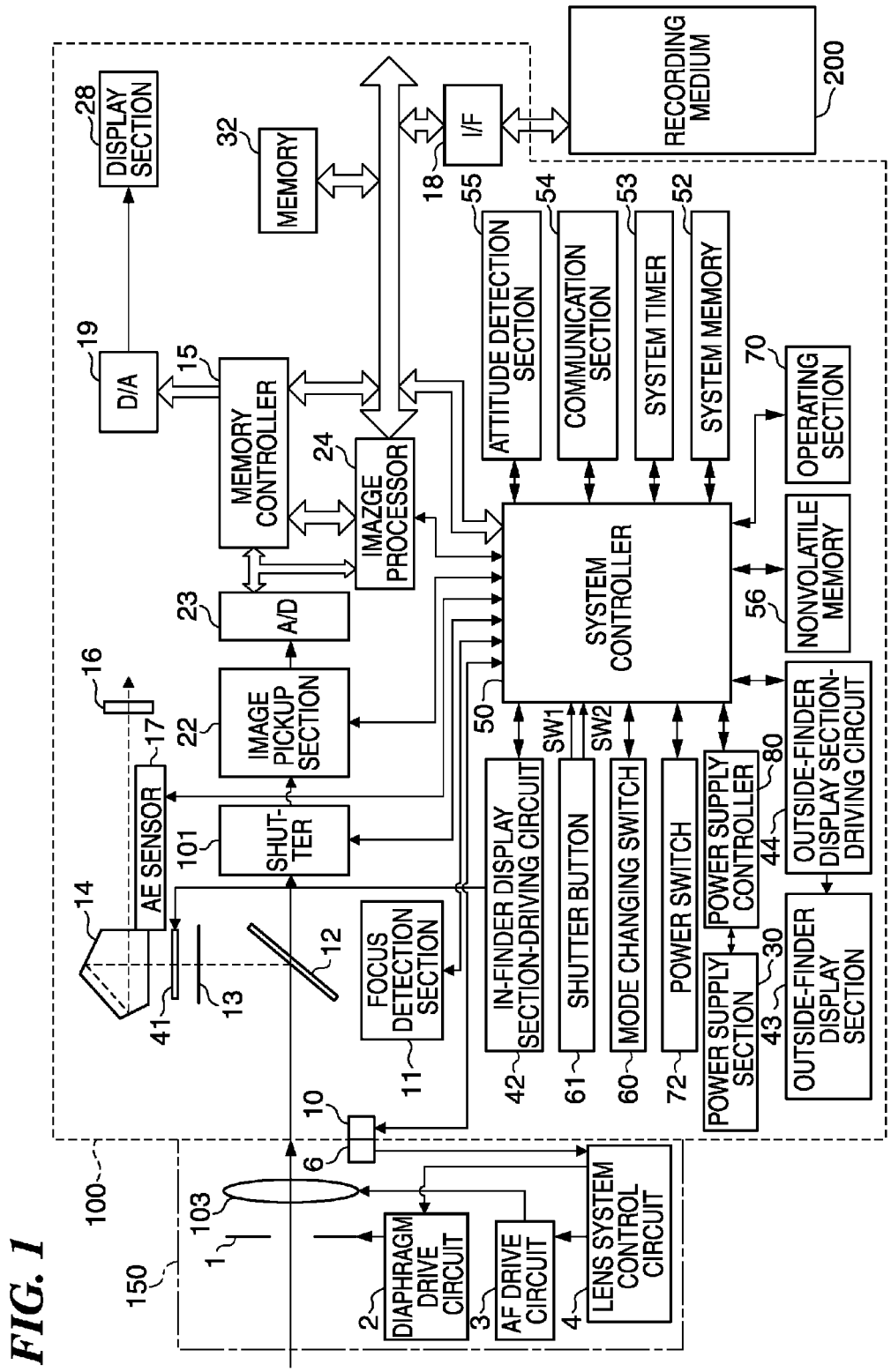
FIG. 1 is a block diagram of a digital camera as an image pickup apparatus according to a first embodiment of the present invention.

FIG. 1 is a block diagram of an image pickup apparatus according to a first embodiment of the present invention.

The illustrated image pickup apparatus is e.g. a digital camera (hereinafter simply referred to as "the camera"), and includes a photographic lens unit (hereinafter referred to as "the lens unit") 150 and a camera body 100. The lens unit 150 is mounted on the camera body 100 in an interchangeable manner.

The lens unit 150 includes a photographic lens (hereinafter simply referred to as "the lens") 103. Although the lens 103 is generally formed by a plurality of lenses, FIG. 1 shows only one lens for the sake of simplification. A communication terminal 6 of the lens unit 150 is connected to a communication terminal 10 of the camera body 100 The lens unit 150 and the camera body 100 can communicate with each other via the communication terminal 6 and 10.

A lens system control circuit 4 provided in the lens unit 150 communicates with a system controller 50 via the communication terminals 6 and 10, and controls a diaphragm 1 via a diaphragm drive circuit 2. Further, the lens system control circuit 4 changes the position of the lens 103 by controlling an AF drive circuit 3 to thereby perform an AF operation for focusing.

In the camera body 100, a quick return mirror (hereinafter simply referred to as "the mirror") 12 is disposed downstream of the lens 103. The system controller 50 causes the mirror 12 to be moved up and down by an actuator (not shown), when performing exposure, live view pickup, or moving image shooting (pickup).

Through up-down control of the mirror 12, an optical image incident through the lens 103 is selectively guided toward a finder 16 or an image pickup section 22. When the mirror is moved down, the mirror 12 is positioned on an optical axis, and the optical image reflected by the mirror 12 is guided to the finder 16 via a pentaprism 14. On the other hand, when the mirror is moved up, the mirror 12 is retracted from the position on the optical axis, and the optical image having passed through the lens 103 forms an image on the image pickup section 22 via a shutter 101. That is, when shooting or live view display is performed, the mirror 12 is flipped upward and retracted from the position on the optical axis so as to guide the optical image to the image pickup section 22.

Note that the mirror 12 is a half mirror which allows light to transmit through a central portion thereof, whereby the mirror 12 causes the optical image to transmit therethrough and enter a focus detection section 11 for performing focus detection.

A photographer as a user can check a focus state and composition of the optical image incident through the lens 103 by viewing a focusing screen 13 via the finder 16 and the pentaprism 14.

The optical image enters an AE sensor 17 via the pentaprism 14. The AE sensor 17 measures a luminance of an object based on the optical image. The focus detection section 11 detects a focus state of the optical image, and transmits defocus information indicative of an amount of defocus to the system controller 50. The system controller 50 controls the driving of the lens 103 based on the defocus information using the AF drive circuit 3 to thereby performs phase difference AF control.

The shutter 101 is disposed downstream of the mirror 12. The shutter 101 is e.g. a focal plane shutter. The system controller 50 controls the shutter 101 to thereby control the exposure time of the image pickup section 22.

The image pickup section 22 includes an image pickup device, such as a CCD or CMOS optical device, and outputs electric signals (analog signals) corresponding to the optical image. An analog-to-digital converter 23 converts the analog signals as an output from the image pickup section 22 to digital signals (i.e. image data) by A/D conversion.

An image processor 24 performs resizing, such as predetermined pixel interpolation and reduction, and color conversion, on the image data as the output from the analog-to-digital converter 23, or image data output from a memory controller 15. Further, the image processor 24 performs predetermined calculation processing using the image data obtained through pickup, and the system controller 50 performs exposure control and ranging control based on results of the calculation processing. With this, AF (Autofocus) processing by the TTL (Through The Lens) method, AE (Automatic Exposure) processing, and EF (Electronic Flash pre-emission) processing are performed.

Further, the image processor 24 performs predetermined calculation processing using the image data obtained through pickup, and performs AWB (Auto White Balance) processing by the TTL method based on results of the calculation processing.

The image data as the output from the analog-to-digital converter 23 is written into a memory 32 via the image processor 24 and the memory controller 15, or directly via the memory controller 15. The memory 32 stores not only the image data as the output from the analog-to-digital converter 23, but also display image data for display on a display section 28. The memory 32 has a sufficient storage capacity to store a predetermined number of still images, and a predetermined duration of a moving image and voice data.

The memory 32 also serves as an image display memory (video memory). A digital-to-analog converter 19 converts the display image data, which has been stored in the memory 32, to analog image signals, and sends the analog image signals to the display section 28. As a consequence, the display image data, which has been stored in the memory 32, is displayed as an image on the display section 28 via the digital-to-analog converter 19.

Note that the display section 28 is implemented by an LCD, for example. Further, by converting image data items accumulated in the memory 32 to analog signals using the digital-to-analog converter 19, and sequentially transferring the analog signals to the display section 28 for display, it is possible to cause the display section 28 to function as an electronic viewfinder, thereby making it possible to perform so-called through image display (live view display).

In an optical path leading to the finder 16, an in-finder liquid crystal display section 41 is provided. The system controller 50 controls the driving of an in-finder display section-driving circuit 42 to display a frame (AF frame) indicative of a ranging point at which AF processing is currently performed, on the in-finder liquid crystal display section 41. Further, the system controller 50 causes the in-finder display section-driving circuit 42 to display an icon indicative of a setting state of the camera, and so forth, on the in-finder liquid crystal display section 41.

Further, the system controller 50 controls an outside-finder display section-driving circuit 44 to display settings, such as a shutter speed and an aperture, on an outside-finder display section 43.

A nonvolatile memory 56 is an electrically erasable and recordable memory, and e.g. an EEPROM (electrically erasable programmable ROM) is used as the nonvolatile memory 56. The nonvolatile memory 56 stores constants, programs, etc., used for the operation of the system controller 50. The programs include programs for executing various processes, described hereinafter.

The system controller 50 controls the overall operation of the camera. The system controller 50 performs processes, described hereinafter, by executing the programs recorded in the nonvolatile memory 56. A RAM is used as a system memory 52. The constants, variables, and programs read out from the nonvolatile memory 56, etc., used for the operation of the system controller 50 are loaded into the system memory 52. The system controller 50 performs display control by controlling the memory 32, the digital-to-analog converter 19, the display section 28, and so forth.

A system timer 53 is a time measurement section that measures time periods used for various types of control, and time of a built-in clock. A mode changing switch 60, a shutter button 61, and an operating section 70 are operation members for inputting various operation instructions to the system controller 50.

The mode changing switch 60 is used for selecting one of a plurality of shooting modes. The plurality of shooting modes include an automatic shooting mode, an automatic scene determination mode, a manual mode, an aperture priority mode (Av mode), and a shutter speed priority mode (Tv mode). Further, the shooting modes include various scene modes configured for respective shooting scene types, a program AE mode, a custom mode, and so forth.

When the shutter button 61 is half-pressed (for shooting preparation instruction), a first shutter switch signal SW1 is delivered to the system controller 50. Upon receipt of the first shutter switch signal SW1, the system controller 50 starts operations, such as AF (Auto Focus) processing, AE (Auto Exposure) processing, AWB (Auto White Balance) processing, EF (Electronic Flash pre-emission) processing, and so forth.

When the shutter button 61 is fully pressed (shooting instruction), a second shutter switch signal SW2 is delivered to the system controller 50. Upon receipt of the second shutter switch signal SW2, the system controller 50 starts a series of shooting operations from reading of a signal output from the image pickup sections 22 to writing of image data in a recording medium 200.

The operating section 70 is an input section for receiving an operation from a user. The operating section 70 includes not only the shutter button 61, but also at least a main electronic dial 202, a sub electronic dial 203, a power switch 72, a protect button 205, a menu button 206, a delete button 207, an enlargement mode button 208, a reproduction instruction button 209, a single/multi-switching button 210, and a multi-controller 211.

A power supply controller 80 is comprised of a battery detection circuit, a DC-to-DC converter, and a switching circuit for switching between blocks to be energized. The power supply controller 80 detects whether or not a battery is mounted thereon, a type of the battery, and a remaining charge amount of the battery. Further, the power supply controller 80 controls the DC-to-DC converter based on the detection results and an instruction from the system controller 50 to apply predetermined voltage to the sections of the camera including the recording medium 200 for a required time period.

A power supply section 30 includes a primary battery, such as an alkaline battery or a lithium battery, or a secondary battery, such as a NiCd battery, a NiMH battery, or a Li battery. Further, the power supply section 30 is provided with an AC adapter, and so forth.

A recording medium interface 18 provides an interface between the camera and the recording medium 200, such as a memory card (semiconductor memory) or a hard disk. The recording medium 200 records image data obtained through pickup.

A communication section 54 is wirelessly connected or connected to a wired cable to transmit and receive video signals (i.e. image data) and audio signals under the control of the system controller 50. The communication section 54 can be connected to a wireless LAN (Local Area Network) or the Internet. The communication section 54 is capable of transmitting image data obtained through pickup (including through images) and image data recorded in the recording medium 200, and further, is capable of receiving image data and other various information items from an external device.

An attitude detection section 55 detects an attitude of the camera with respect to the gravity direction. The system controller 50 determines, based on an attitude detected by the attitude detection section 5, in which of a horizontal attitude and a vertical attitude the camera is held when shooting an image of the obtained image data. Further, the system controller 50 is capable of generating an image file by adding direction information indicative of the attitude detected by the attitude detection section 55 to the image data, and further, recording the image data in the recording medium 200 after rotating the image data according to a result of the above-mentioned determination. Note that as the attitude detection section 55, for example, an acceleration sensor or a gyro sensor is used.

Figure 2A:
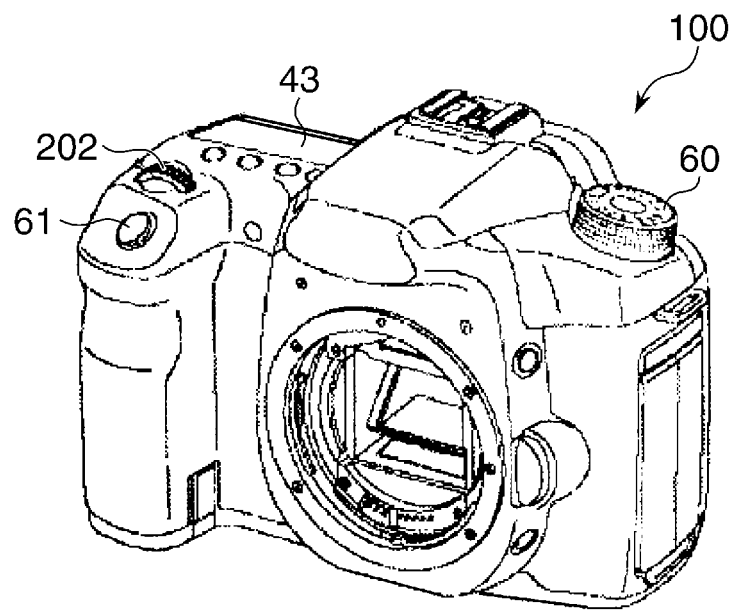
FIG. 2A is a perspective view showing the appearance of a camera body of the digital camera shown in FIG. 1, as viewed from the front.
Figure 2B:
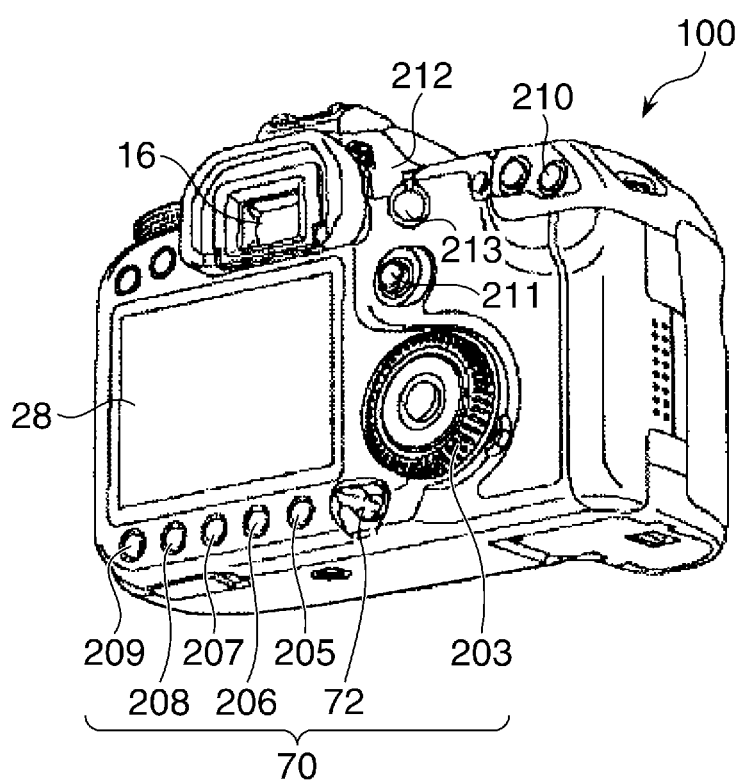
FIG. 2B is a perspective view showing the appearance of the camera body of the digital camera, as viewed from the rear.

FIGS. 2A and 2B are perspective views showing the appearance of the camera body 100 appearing in FIG. 1, in which FIG. 2A shows the camera body as viewed from the front, and FIG. 2B shows the camera body as viewed from the rear. Note that the same components in FIGS. 2A and 2B as those in FIG. 1 are denoted by the same reference numerals.

The shutter button 61 disposed on an upper surface of the camera body 100 is a button for inputting a shooting preparation instruction and a shooting instruction as mentioned above. When the shutter button 61 is half-pressed, the system controller 50 performs measurement of a luminance of an object and focusing. Further, when the shutter button 61 is fully pressed, the system controller 50 controls the shutter 101, and performs shooting.

The main electronic dial 202 is a rotation operation member, and the user can set values of the shutter speed, the aperture, and so forth by rotating the main electronic dial 202. Further, the user can finely adjust a magnification ratio in the enlargement mode by rotating the main electronic dial 202.

The sub electronic dial 203 is a rotation operation member, and the user can set values of the aperture, exposure correction, and so forth by rotating the sub electronic dial 203. Further, in an image displayed state, the user can perform an image advancing operation by rotating the sub electronic dial 203.

The power switch 72 is disposed on a rear side of the camera body 100, and is used for power on or off. The protect button 205 is used for performing e.g. protection or rating processing on the image data stored in the recording medium 200. The menu button 206 is used for displaying the various setting screens on the display section 28.

The delete button 207 is used for deleting an image stored in the recording medium 200. The enlargement mode button 208 is used for providing an instruction for shifting the mode to the enlargement mode in the reproduction state (enlargement mode starting instruction), and an instruction for escaping from the enlargement mode (enlargement mode terminating instruction). The reproduction instruction button 209 is used for displaying the image data stored in the recording medium 200 on the display section 28.

The single/multi-switching button 210 is used for selecting a mode for switching between modes for selecting a ranging point as a start point of automatic focusing. The multi-controller 211 is used for setting a raging point as the start point of automatic focusing. The multi-controller 211 is used for moving an enlargement frame (enlarged area) in a state in which an enlarged image is displayed, and is an operation member which can be operated in a plurality of directions.

A moving image lever 212 is used for shifting the camera to a moving image-recordable state. The user shifts the camera to the moving image-recordable state by flipping down the lever to a moving image-recording side (turning on the moving image lever 212 by flipping down the lever to a position of the moving image shooting mode). Hereinafter, the moving image-recordable state (moving image-recordable operation mode) is referred to as the moving image live view state (moving image shooting mode). A moving image recording button 213 is a push-button switch for use in starting and terminating moving image recording. When the moving image recording button 213 is depressed once, it is turned on, whereas when it is depressed once more, it is turned off.

Figure 3A:
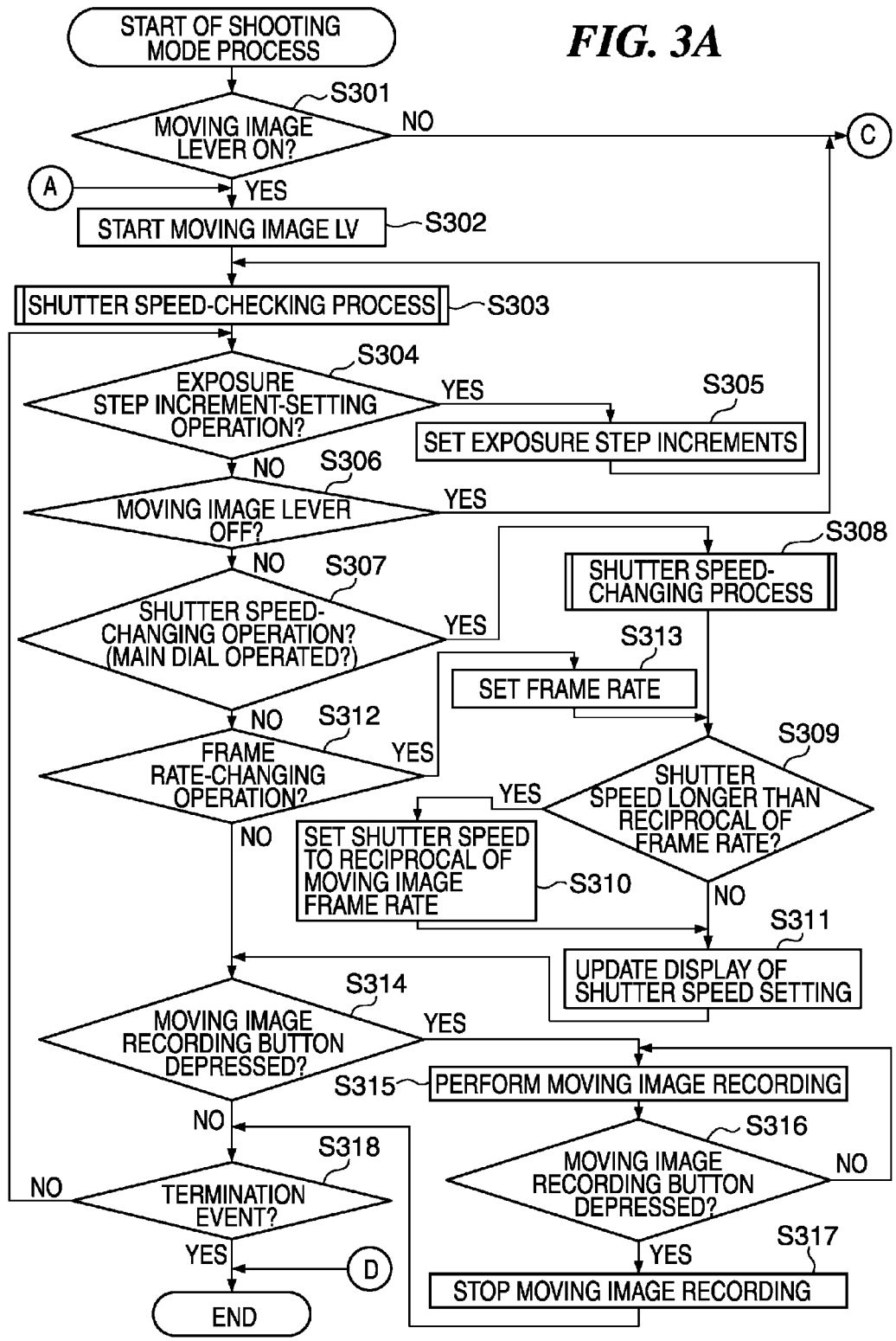
FIG. 3A is a flowchart of a shooting mode process performed by the camera.
Figure 3B:
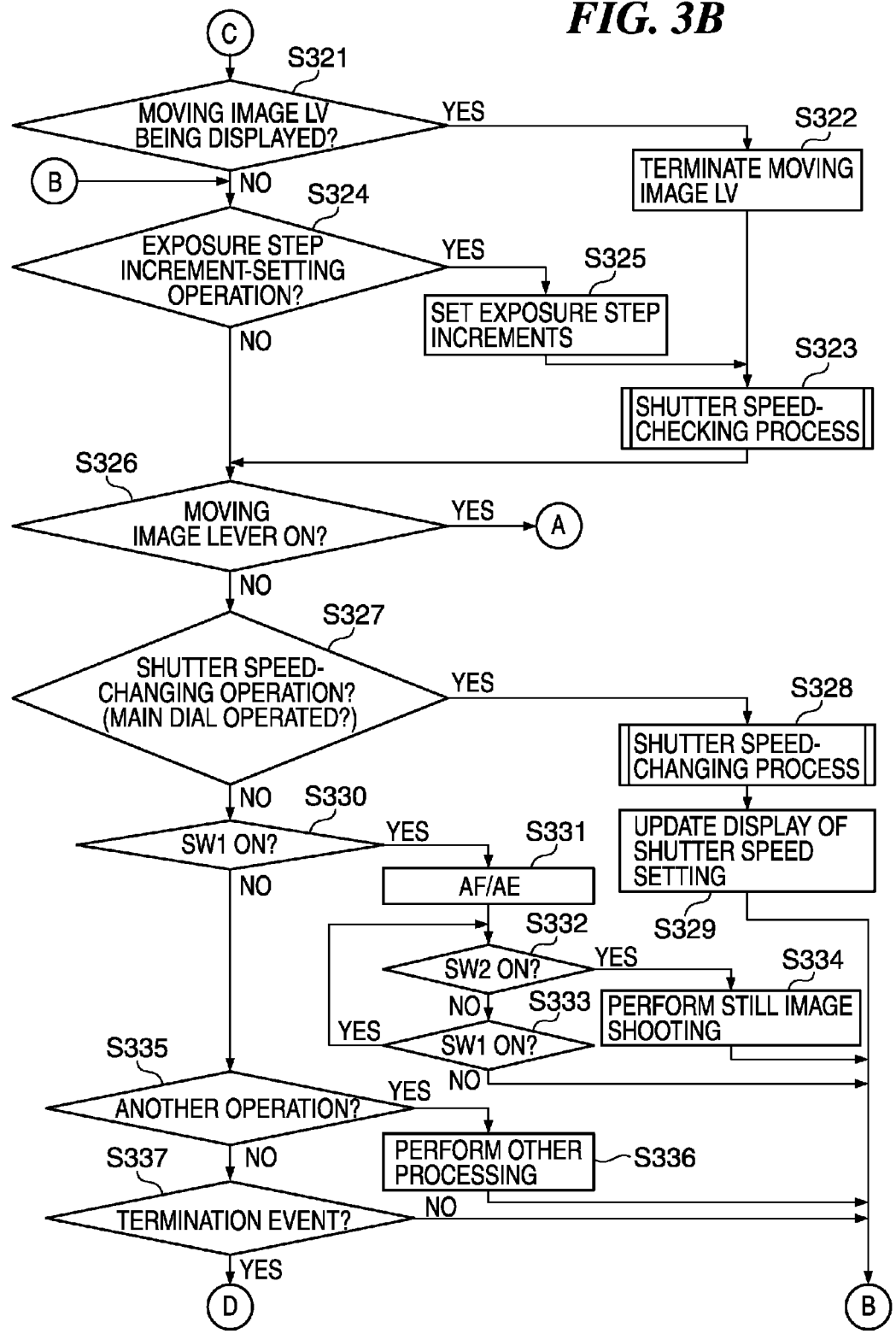
FIG. 3B is a continuation of FIG. 3A.

FIGS. 3A and 3B are a flowchart of a shooting mode process performed by the camera shown in FIG. 1. The shooting mode process is performed by the system controller 50 loading a program recorded in the nonvolatile memory 56 into the system memory 52 and executing the program.

When the camera is powered on in a state in which the camera is set to the shooting mode, or when the camera is switched from a state in which the camera has been started in the other operation mode, such as the reproduction mode, to the shooting mode by half-pressing the shutter button 61, the system controller 50 starts the shooting mode process.

First, the system controller 50 determines whether or not the moving image lever 212 is on (i.e. the moving image lever 212 is at a position of the moving image shooting mode) (S301). If the moving image lever 212 is on (YES to the step S301), the system controller 50 starts the moving image live view display (moving image LV) (S302).

In this step, the system controller 50 moves up the mirror 12. Then, the system controller 50 sends a set aperture value to the lens system control circuit 4 to narrow the diaphragm 1 via the diaphragm drive circuit 2 (i.e. the diaphragm 1 is controlled to the set aperture value). Then, the system controller 50 opens the shutter 101. Then, the system controller 50 controls the timing of driving the image pickup section 22 based on a set shutter speed. Further, the system controller 50 controls the image pickup section 22 to thereby amplify analog signals with a gain corresponding to a set ISO value. The analog signals as outputs from the image pickup section 22 are converted to digital signals by the analog-to-digital converter 23, and are written into the memory 32 by the image processor 24 as image data via the memory controller 15.

Then, the system controller 50 sends the image data written into the memory 32 to the digital-to-analog converter 19 via the memory controller 15. As a consequence, the image data is converted to analog image signals by the digital-to-analog converter 19, and are displayed on the display section 28 as the moving image live view.

The image of the moving image live view is not an image picked up at the same shutter speed (set shutter speed) as used for image data recorded as a moving image. However, in the moving image live view, by controlling the timing of driving the image pickup section 22, the shutter speed is made close to the set shutter speed, and an image having brightness equivalent to the image data recorded at the set shutter speed is displayed by performing gain adjustment. That is, in the moving image live view, a moving image on which the set shutter speed is reflected is displayed.

Then, the system controller 50 performs a shutter speed-checking process, as described hereinafter (S303). In this shutter speed-checking process, if a shutter speed set for the still image is longer than time required to pick up one frame at a frame rate set for the moving image, the system controller 50 adjusts the setting of the shutter speed such that it becomes not longer than the time required to pick up one frame of the moving image.

Next, the system controller 50 determines whether or not an exposure step increment-setting operation has been performed (S304). If the exposure step increment-setting operation has been performed (YES to the S304), the system controller 50 records the exposure step increment selected by the user's operation, in the nonvolatile memory 56 (S305). Then, the system controller 50 returns to the step S303.

FIGS. 4A and 4B are diagrams useful in explaining setting screens displayed on the display section 28 appearing in FIG. 1, in which FIG. 4A shows an exposure step increment-setting screen, and FIG. 4B shows a moving image recording size-setting screen.

When the menu button 206 has been pressed by the user in the shooting mode, the system controller 50 displays a menu screen for configuring various settings on the display section 28. Then, if an item of exposure step increment configuration is selected on the menu screen, the system controller 50 displays the exposure step increment-setting screen shown in FIG. 4A on the display section 28.

The exposure step increment-setting screen shown in FIG. 4A displays first to third options, and the user can select one of the first to third options (exposure step increment-setting operation).

FIGS. 5A to 5C are diagrams useful in explaining setting values of the shutter speed, which can be set from the exposure step increment-setting screen, in which FIG. 5A shows a list of setting values of the shutter speed in ⅓-stop increments, FIG. 5B shows a list of setting values of the shutter speed in ½-stop increments, and FIG. 5C shows a list of setting values of the shutter speed in 1-stop increments. Note that the lists (tables) shown in FIGS. 5A to 5C are stored in the nonvolatile memory 56 in advance.

As shown in FIG. 4A, the first option is called ⅓-stop step which is displayed as "SHUTTER SPEED ⅓, EXPOSURE CORRECTION ⅓, ⅓" and enables the shutter speed and the exposure correction to be set in ⅓-stop increments (see FIG. 5A). The second option shown is called 1-stop step which is displayed as "SHUTTER SPEED 1, EXPOSURE CORRECTION ⅓, 1/1", and enables the shutter speed to be set in 1-stop increments and the exposure correction to be set in ⅓-stop increments (see FIG. 5C). The third option shown is called ½-stop step which is displayed as "SHUTTER SPEED ½, EXPOSURE CORRECTION ½, ½", and enables the shutter speed and the exposure correction to be set in ½-stop increments (see FIG. 5B).

The exposure step increment set by the user is recorded in the nonvolatile memory 56 as a setting of the current exposure steps.

Then, referring again to FIG. 3A, if no exposure step increment-setting operation has been performed (NO to the step S304), the system controller 50 determines whether or not the moving image lever 212 is turned off (moved to the position of the still image shooting mode) (S306). If the moving image lever 212 is turned off (YES to the step S306), the system controller 50 proceeds to a step S321, referred to hereinafter.

If the moving image lever 212 is on (NO to the step S306), the system controller 50 determines whether or not an operation for changing the shutter speed has been performed (S307). In this step, the system controller 50 determines whether or not the main electronic dial 202 has been operated.

If the operation for changing the shutter speed has been performed (YES to the S307), the system controller 50 performs a shutter speed-changing process according to an operation amount of the main electronic dial 202 (S308). By performing this changing process, a shutter speed based on the operation of the main electronic dial 202 is provisionally set.

Then, the system controller 50 determines whether or not the set shutter speed is longer than the reciprocal of the currently set moving image frame rate (S309). For example, when the frame rate is 25 fps, the system controller 50 determines whether or not the shutter speed is longer than 1/25 seconds.

If the shutter speed is longer than the reciprocal of the currently set moving image frame rate (YES to the S309), the system controller 50 forcibly sets the shutter speed to the reciprocal of the moving image frame rate (S310). For example, when the moving image frame rate is 25 fps, and the set shutter speed (before change) is 1/20 seconds, the system controller 50 changes the shutter speed to 1/25 seconds. This makes it possible to set the shutter speed to a value close to the shutter speed before change (i.e. shutter speed set by the user) as much as possible while preventing the shutter speed from becoming longer than one frame of the moving image.

Note that the changed shutter speed set in this step is not required to be exactly the reciprocal of the moving image frame rate. The changed shutter speed is only required to be shorter than the shutter speed before change, not longer than a time required to pick up one frame at the moving image frame rate, and longer than one of values conforming to the current setting of exposure step increments, which is shorter than the shutter speed before change and is closest thereto.

For example, in a case where the shutter speed before change is 1/20 seconds, the frame rate of the moving image is 24 fps, and the exposure steps are in 1/2 stop-increments, the shutter speed may be changed in the following manner: The shutter speed is changed not to 1/24 seconds which is the reciprocal of the frame rate, but to 1/25 seconds which is shorter than 1/20 seconds as the shutter speed before change, not longer than 1/24 seconds as the reciprocal of the frame rate, and longer than 1/30 seconds (one of values set in 1/2 stop-increments, which is shorter than 1/20 seconds and closest thereto).

Further, the changed shutter speed is desirable to be set to one of all shutter speed values which can be set in any of the exposure step increments. This makes it possible to use a control command for an existing shutter speed, and hence it is possible to reduce complication of processing. For example, the above-mentioned 1/25 seconds is does not exist in the exposure steps in the 1/2-stop increments, but exists in the exposure steps in the 1/3-stop increments, and hence by changing the shutter speed to such a value, it is possible to use and set the same control command as used in the case where the exposure steps are in 1/3-stop increments, without preparing a new command. Further, even when such a value as is close to the reciprocal of the frame rate is used, it is possible to set the shutter speed to a value close to the shutter speed before change (i.e. the shutter speed set by the user) as much as possible while preventing the shutter speed from becoming longer than one frame of the moving image.

After performing the step S310, the system controller 50 updates the setting of the shutter speed displayed on the display section 28 (S311). Note that if the shutter speed is not longer than the reciprocal of the currently set moving image frame rate (NO to the S309), the system controller 50 proceeds to the step S311.

In the step S311, in a case where the answer to the question of the step S309 reached via the step S308 is negative (NO), the system controller 50 finally determines the shutter speed provisionally set in the step S308. Then, the system controller 50 causes the determined shutter speed to be reflected on the display on the display section 28, and causes the same to be reflected also on the moving image live view display.

On the other hand, in the step S311, in a case where the answer to the question of the step S309 reached via the step S308 is affirmative (YES), the system controller 50 finally determines, as the shutter speed, not the shutter speed provisionally set in the step S308, but the shutter speed changed in the step S310. Then, the system controller 50 causes the determined shutter speed to be reflected on the display on the display section 28, and causes the same to be reflected also on the moving image live view display.

That is, even when the shutter speed is set to a value longer than the reciprocal of the frame rate in the step S308, this sets only a provisionally set value, and is neither reflected on the display of the setting nor on the moving image live view display. Although the system controller 50 changes the setting of the shutter speed according to the rotational operation of the main electric dial 202 toward longer exposure time until the shutter speed reaches the reciprocal of the frame rate or a value close thereto, the shutter speed is not changed any longer after that even when the main electric dial 202 is operated toward longer exposure time. Thus, the long exposure-side limit value of the shutter speed is the reciprocal of the frame rate or a value close thereto.

In the step S307, if the operation for changing the shutter speed has not been performed (NO to the step S307), the system controller 50 determines whether or not an operation for changing the frame rate has been performed (S312). In the step S312, for example, the system controller 50 determines whether or not an operation of the user for selecting one of the options on the moving image recording size-setting screen shown in FIG. 4B has been performed.

As shown in FIG. 4B, options which can be set as settings of the moving image recording size are each formed by a set of settings of the number of recording pixels, the frame rate, and a moving image compression method, and there are seven options in total. There are three choices for the frame rate, i.e. 25 fps, 24 fps, and 50 fps.

Note that the method of setting the frame rate is not limited to this example, but the frame rate may be set by selecting from options formed by only choices for the frame rate. Further, there may be provided other choices for the frame rate, such as 30 fps and 60 fps.

If an operation for changing the frame rate has been performed (YES to the S312), the system controller 50 sets the frame rate according to the changing operation (S313). Then, the system controller 50 proceeds to the step S309.

In the step S313, for example, the system controller 50 sets the frame rate of the moving image to a frame rate included in the set of settings of the moving image recording size, which has been selected on the moving image recording size-setting screen. Then, the system controller 50 records the set frame rate in the nonvolatile memory 56, and causes the same to be reflected on the moving image live view display.

If the answer to the question of the step S309 reached via the step S313 is affirmative (YES), the system controller 50 finally determines the shutter speed set in the step S310 according to the change in frame rate. Then, the system controller 50 causes the determined shutter speed to be reflected on the display on the display section 28, and causes the same to be reflected also on the moving image live view display.

On the other hand, if the answer to the question of the step S309 reached via the step S313 is negative (NO), there is no change in the shutter speed, and hence the system controller 50 does not update the display.

Figure 6A:
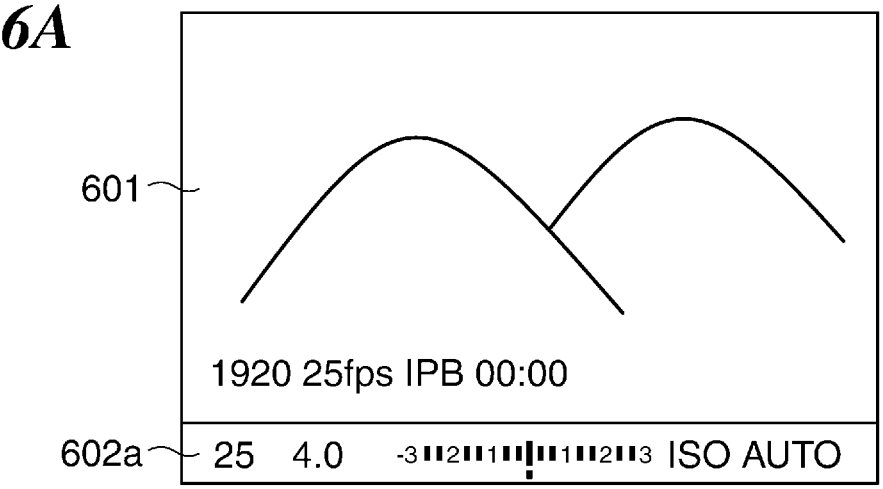
FIG. 6A is a diagram showing a first example of display which is useful in explaining the display update of the shutter speed setting, which is performed in the shooting mode process shown in FIGS. 3A and 3B.
Figure 6B:
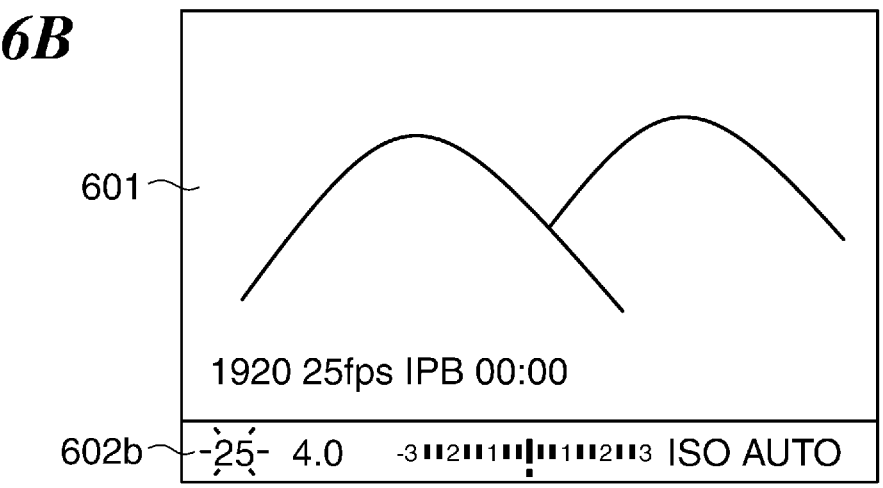
FIG. 6B is a diagram showing a second example of display which is useful in explaining the display update of the shutter speed setting.
Figure 6C:
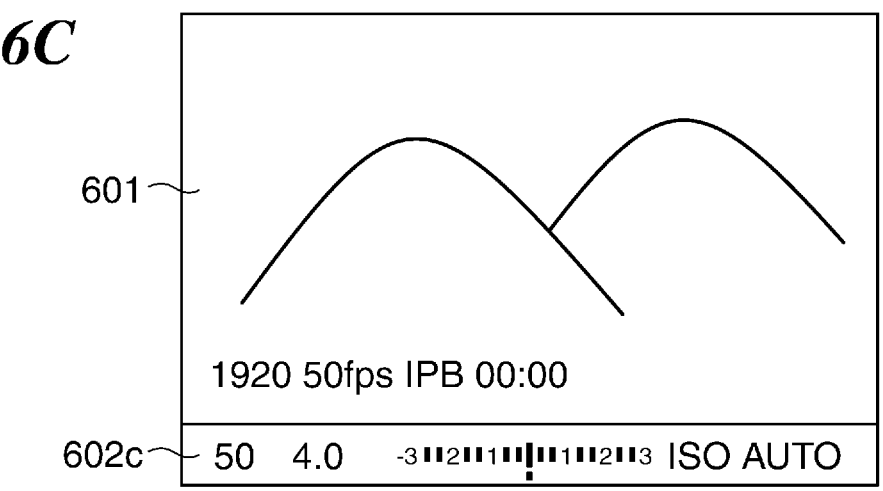
FIG. 6C is a diagram showing a third example of display which is useful in explaining the display update of the shutter speed setting.

FIGS. 6A to 6C are diagrams useful in explaining update of the display of the shutter speed setting, which is performed in the shooting mode process shown in FIGS. 3A and 3B, in which FIG. 6A shows a first example, FIG. 6B shows a second example, and FIG. 6C shows a third example.

In the example shown in FIG. 6A, the frame rate is 25 fps, and the exposure steps are in 1/3-stop increments. Further, the shutter speed is set to 1/25 seconds which is a value conforming to the setting of 1/3-stop increments. The display section 28 displays the currently set shutter speed, denoted by reference numeral 602a, together with a moving image live view 601. The shutter speed is 1/25 seconds which is the reciprocal of the frame rate of 25 fps, and has reached the long exposure-side limit value of the shutter speed. Therefore, even when the main electronic dial 202 is further rotated toward longer exposure time from this state, the system controller 50 does not change the shutter speed, and the display of the shutter speed 602a is not changed.

In the example shown in FIG. 6B, the frame rate is 25 fps, and the exposure steps are in 1/2-stop increments. Further, the shutter speed is set to 1/25 seconds which is not a value conforming to the setting of ½-stop increments. This is a state in which the reciprocal of the frame rate or a value close to the reciprocal has been set as the shutter speed in the step S310. The display section 28 displays the currently set shutter speed, denoted by reference numeral 602b, together with the moving image live view 601. Since the shutter speed is not a value conforming to the setting of ½-stop increments, to prevent the user from being confused, the system controller 50 causes the shutter speed 602b to be displayed in a blinking manner. This causes the user to recognize an unusual state in which the value of the shutter speed does not conform to the setting of ½-stop increments.

In this case, the manner of display of the shutter speed 602b is not limited to the blinking display, but may be changed from the manner of display of the shutter speed 602a appearing in FIG. 6A e.g. by displaying the shutter speed 602b with a color or thickness different from that of the shutter speed 602a. Further, the system controller 50 may display the shutter speed in the manner of display different from the manner of display of the shutter speed 602a appearing in FIG. 6A only for a predetermined time period (e.g. two seconds) after the setting of the shutter speed has been changed, and upon the lapse of the predetermined time period has elapsed, the system controller 50 may display the shutter speed in the same manner of display as the manner of display of the shutter speed 602a appearing in FIG. 6A.

Further, not only the shutter speed 602b, but also a portion showing "25 fps" indicative of the frame rate may be changed in the manner of display e.g. by simultaneously blinking the display of the portion or changing the color thereof. By doing this, it is possible to cause the user to be aware that the frame rate is a cause of the value of the shutter speed 602b not conforming to the setting of ½-stop increments. Note that the shutter speed is ¹⁄₂₅ seconds which is the reciprocal of the frame rate of 25 fps, and has reached the long exposure-side limit value of the shutter speed. Therefore, even when the main electronic dial 202 is further rotated toward longer exposure time from this state, the system controller 50 does not change the shutter speed.

In the example shown in FIG. 6C, the frame rate is 50 fps, and the exposure steps are in ⅓-stop increments. Further, the shutter speed is set to ¹⁄₅₀ seconds which is a value conforming to the setting of ⅓-stop increments. Since the shutter speed is a value conforming to the setting of ⅓-stop increments, in the present example, similar to FIG. 6A, the system controller 50 displays the shutter speed, denoted by reference numeral 602c, in the normal manner of display. The shutter speed 602c is ¹⁄₅₀ seconds which is the reciprocal of the frame rate of 50 fps, and has reached the long exposure-side limit value of the shutter speed. Therefore, even when the main electronic dial 202 is further rotated toward longer exposure time from this state, the system controller 50 does not change the shutter speed, and the display of the shutter speed 602c is not changed.

Referring again to FIG. 3A, if the operation for changing the frame rate has not been performed (NO to the step S312), the system controller 50 determines whether or not the moving image recording button 213 has been depressed (S314). Note that after performing the step S311, the system controller 50 proceeds to the step S314.

If the moving image recording button 213 has been depressed to be turned on (YES to the S314), the system controller 50 starts moving image recording (S315). In the moving image recording, the system controller 50 use various parameters including the set frame rate and shutter speed to thereby cause the image pickup section 22 to shoot a moving image. Then, the system controller 50 records the moving image obtained through pickup in the recording medium 200 as a moving image file.

Then, the system controller 50 determines whether or not the moving image recording button 213 has been depressed once more (S316). If the moving image recording button 213 has not been depressed once more (NO to the step S316), the system controller 50 returns to the step S315, and continues the moving image recording.

On the other hand, if the moving image recording button 213 has been depressed once more to be turned off (YES to the step S316), the system controller 50 stops the moving image recording (S317). Then, the system controller 50 determines whether or not a termination event of the shooting mode has been generated (S318).

The termination event of the shooting mode refers to an operation for switching off the power, an operation for shifting the operation mode to the other operation mode, such as the reproduction mode, lowering of the remaining charge amount of the battery, or the like. If a termination event has been generated (YES to the step S318), the system controller 50 terminates the shooting mode process. If no termination event has been generated (NO to the step S318), the system controller 50 returns to the step S304.

If it is determined in the step S301 that the moving image lever is off (NO to the step S301), i.e. if the shooting mode is the still image shooting mode (moving image-unrecordable state), the system controller 50 determines whether or not the moving image live view is being displayed (S321). If the moving image live view is being displayed (YES to the S321), the system controller 50 terminates the display of the moving image live view (S322). Here, the system controller 50 causes the image pickup section 22 to stop the image pickup operation, and close the shutter 101. Further, the system controller 50 moves down the mirror 12, and causes the diaphragm drive circuit 2 to open the diaphragm 1. With this, the system controller 50 terminates the moving image live view.

Then, the system controller 50 performs the shutter speed-checking process as described hereinafter (S323). Note that the shutter speed-checking process performed in the step S323 reached via the step S322 is for checking the shutter speed when the shooting mode is shifted from the moving image shooting mode to the still image shooting mode. When the shutter speed is set to a value which does not conform to any exposure step increments in the step S310, the value is adjusted to a value associated with exposure step increments by performing the shutter speed-checking process.

If the moving image live view is not being displayed (NO to the S321), the system controller 50 determines whether or not the exposure step increment-setting operation has been performed (S324). Note that the step S324 is the same as the step S304.

If the exposure step increment-setting operation has been performed (YES to the S324), the system controller 50 sets the exposure step increments selected by the user's operation, and records the selected setting of the exposure step increments in the nonvolatile memory 56 (S325). Then, the system controller 50 proceeds to the step S323.

In the shutter speed-checking process performed in the step S323 reached via the step S325, in a case where the setting of exposure step increments is changed to make the currently set value of the shutter speed not conforming to the setting of exposure step increments after change, the shutter speed is adjusted to a value corresponding to the exposure step increments after change.

If the exposure step increment-setting operation has not been performed (NO to the S324), the system controller 50 determines whether or not the moving image lever 212 has been turned on (moved to the position of the moving image shooting mode) (S326). Note that after performing the step S323, the system controller 50 proceeds to the step S326.

If the moving image lever 212 has been turned on (YES to the step S326), the system controller 50 proceeds to the step S302. On the other hand, if the moving lever 212 is off (NO to the step S326), the system controller 50 judges that the camera is in the moving image-unrecordable state, and determines whether or not the shutter speed-changing operation has been performed (S327). Note that the step S327 is the same as the step S307.

If the shutter speed-changing operation has been performed (YES to the S327), the system controller 50 performs the shutter speed-changing process (S328). Note that the step S328 is the same as the step S308. However, the shutter speed changed in the step S328 is not adjusted according to the frame rate of the moving image, and hence it is a finally determined value.

Then, the system controller 50 updates the setting of the shutter speed displayed on the display section 28 (S329), and returns to the step S324.

If the shutter speed-changing operation has not been performed (NO to the S327), the system controller 50 determines whether or not the shutter button 61 has been half-pressed to turn on the first shutter switch signal SW1 (S330). If the first shutter switch signal SW1 has been turned on (YES to the step S330), the system controller 50 performs shooting preparations including automatic focus (AF) processing and automatic exposure (AE) processing (S331). Note that in a case where exposure adjustment is manually performed, AE processing is not performed.

Next, the system controller 50 determines whether or not the shutter button 61 has been fully pressed to turn on the second shutter switch signal SW2 (S332). If the second shutter switch signal SW2 is off (NO to the step S332), the system controller 50 determines whether or not the first shutter switch signal SW1 is on (S333).

If the first shutter switch signal SW1 is on (YES to the S333), the system controller 50 returns to the step S332. If the first shutter switch signal SW1 is off (NO to the S333), the system controller 50 returns to the step S324.

If the second shutter switch signal SW2 has been turned on (YES to the step S332), the system controller 50 performs still image shooting (S334). In this step, the system controller 50 uses various parameters including the set shutter speed to cause the image pickup section 22 to shoot a still image, and records the still image obtained through shooting (pickup) in the recording medium 200 as a still image file. Then, the system controller 50 returns to the step S324.

If it is determined in the step S330 that the first shutter switch signal SW1 is off (NO to the step S330), the system controller 50 determines whether or not another operation has been performed (S335). If another operation has been performed (YES to the step S335), the system controller 50 performs processing corresponding to the other operation (other processing) (S336). Then, the system controller 50 returns to the step S324.

If no other operation has been performed (NO to the step S335), the system controller 50 determines whether or not a termination event has been generated (S337). The step S337 is the same as the step S318. If a termination event has been generated (YES to the step S337), the system controller 50 terminates the shooting mode process. On the other hand, if no termination event has been generated (NO to the step S337), the system controller 50 returns to the step S324.

Incidentally, in the camera body 100 shown in FIG. 1, in a case where the moving image lever 212 is at the position of the moving image shooting mode (S302 to S318), even when the shutter button 61 is fully pressed, still image shooting is not performed. However, this is not limitative, but the system controller 50 may perform still image shooting when the shutter button 61 is fully pressed even in the case where the moving image lever 212 is at the position of the moving image shooting mode. In doing this, in a case where the shutter speed is set to the reciprocal of the frame rate in the step S310, when shooting a still image, the system controller 50 performs shooting at this shutter speed (the reciprocal of the frame rate or a value close to the reciprocal). If the shutter speed is different between a live view image checked by the user in the moving image live view and an image obtained through still image shooting, there is a possibility that an image intended by the user is not obtained, and hence the shutter speed is set as above.

Figure 7:
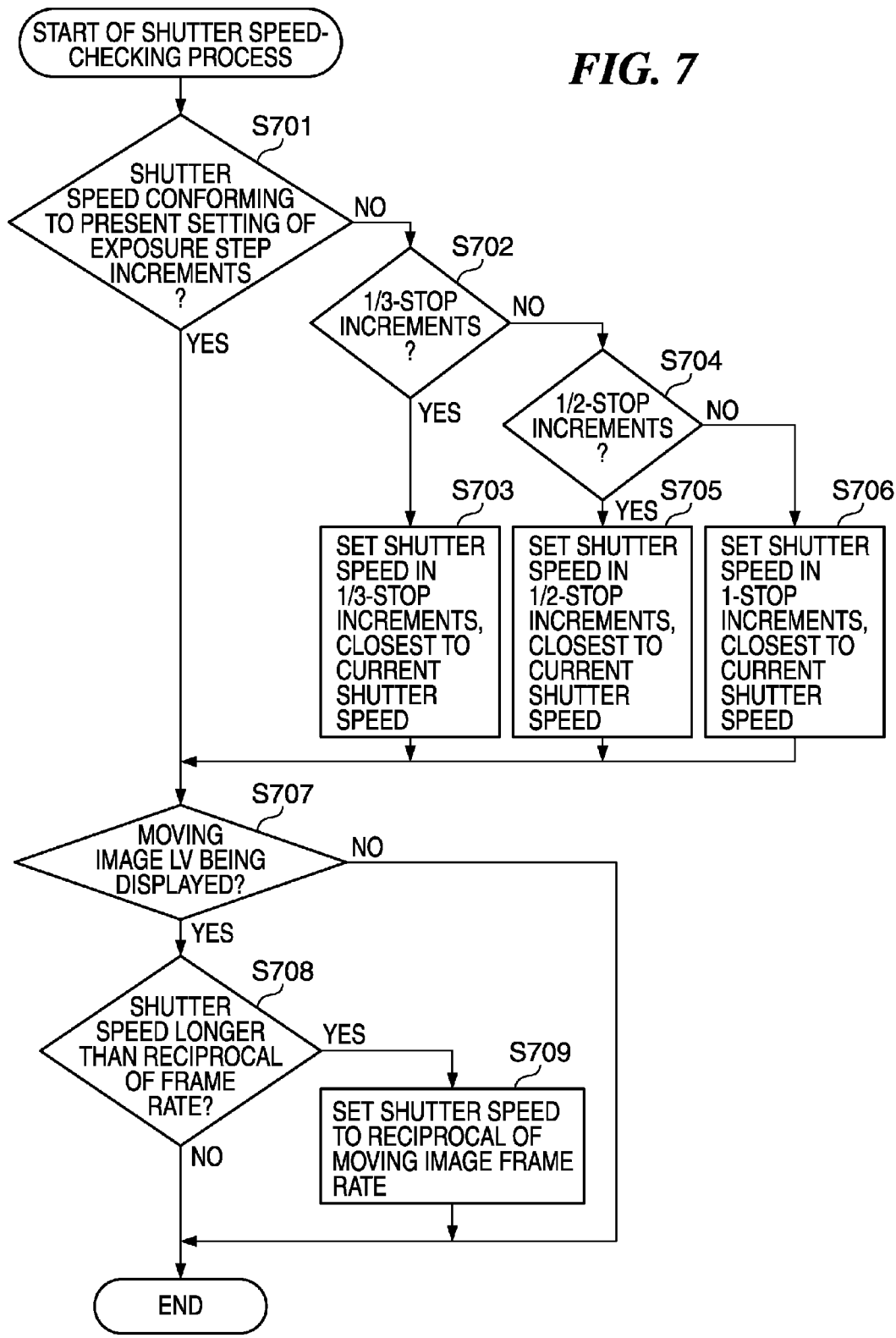
FIG. 7 is a flowchart of a shutter speed-checking process performed in a step in the shooting mode process.

FIG. 7 is a flowchart of the shutter speed-checking process performed in the step S303 or S323 in the shooting mode process in FIGS. 3A and 3B. The shutter speed-checking process in FIG. 7 is performed by the system controller 50 loading a program recorded in the nonvolatile memory 56 into the system memory 52 and executing the program.

When the shutter speed-checking process is started, the system controller 50 determines whether or not the set shutter speed is a value conforming to the current setting of the exposure step increments (S701). In this step, the system controller 50 determines whether or not the set shutter speed is a shutter speed existing in one of lists (tables) shown in FIGS. 5A to 5C, which corresponds to the current setting of exposure step increments.

If the shutter speed is not a value conforming to the current setting of exposure step increments (NO to the S701), the system controller 50 determines whether or not the current exposure step increments are ⅓-stop increments (S702). If the current exposure step increments are ⅓-stop increments (YES to the S702), the system controller 50 changes the shutter speed to one of values which can be set in ⅓-stop increments (values included in the list shown in FIG. 5A) which is closest to the current shutter speed (shutter speed before change) (S703). For example, when the shutter speed is 1/45 seconds, the system controller 50 changes the shutter speed to 1/50 seconds.

If the current exposure step increments are not ⅓-stop increments (NO to the S702), the system controller 50 determines whether or not the current exposure step increments are ½-stop increments (S704). If the current exposure step increments are ½-stop increments (YES to the S704), the system controller 50 changes the shutter speed to one of values which can be set in ½-stop increments (values included in the list shown in FIG. 5B), which is closest to the current shutter speed (shutter speed before change) (S705). For example, when the shutter speed is 1/25 seconds, the system controller 50 changes the shutter speed to 1/30 seconds.

If the current exposure step increments are not ½-stop increments (NO to the S704), the system controller 50 changes the shutter speed to one of values which can be set in 1-stop increments (values included in the list shown in FIG. 5C), which is closest to the current shutter speed (shutter speed before change) (S706). For example, when the shutter speed is 1/25 seconds, the system controller 50 changes the shutter speed to 1/30 seconds.

By performing the steps S702 to S706, in a case where the setting of shutter speed step increments (exposure step increments) is changed, the shutter speed is adjusted to a value corresponding to the changed setting of shutter speed increments. Further, also in a case where the moving image live view is canceled in a state in which the shutter speed is adjusted according to the frame rate of the moving image in the moving image live view and the mode is shifted to the still image shooting mode, the shutter speed is also adjusted to a value conforming to the current setting of exposure step increments.

If the shutter speed is a value conforming to the current setting of exposure step increments (the number of stop) (YES to the S701), or after performing the step S703, S705, or S706, the system controller 50 determines whether or not the moving image live view is being displayed (S707). If the moving image live view is being displayed (YES to the S707), the system controller 50 determines whether or not the set shutter speed is longer than the reciprocal of the currently set frame rate of the moving image (S708).

If the set shutter speed is longer than the reciprocal of the currently set frame rate of the moving image (YES to the S708), the system controller 50 changes the shutter speed to the reciprocal of the frame rate of the moving image or a value close thereto, and sets the changed shutter speed (S709). The step S709 is the same as the step S310 in FIG. 3A. Then, the system controller 50 terminates the shutter speed-checking process.

If the set shutter speed is not longer than the reciprocal of the currently set frame rate of the moving image (NO to the S708), the system controller 50 terminates the shutter speed-checking process. Note that if the moving image live view is not being displayed (NO to the S707), the system controller 50 terminates the shutter speed-checking process.

By performing the shutter speed-checking process, even when the setting of exposure step increments is changed during the moving image live view, it is possible to set the shutter speed to a value close to the shutter speed before change (i.e. the shutter speed set by the user) as much as possible while preventing the shutter speed from being longer than a time corresponding to one frame of the moving image.

Figure 8:
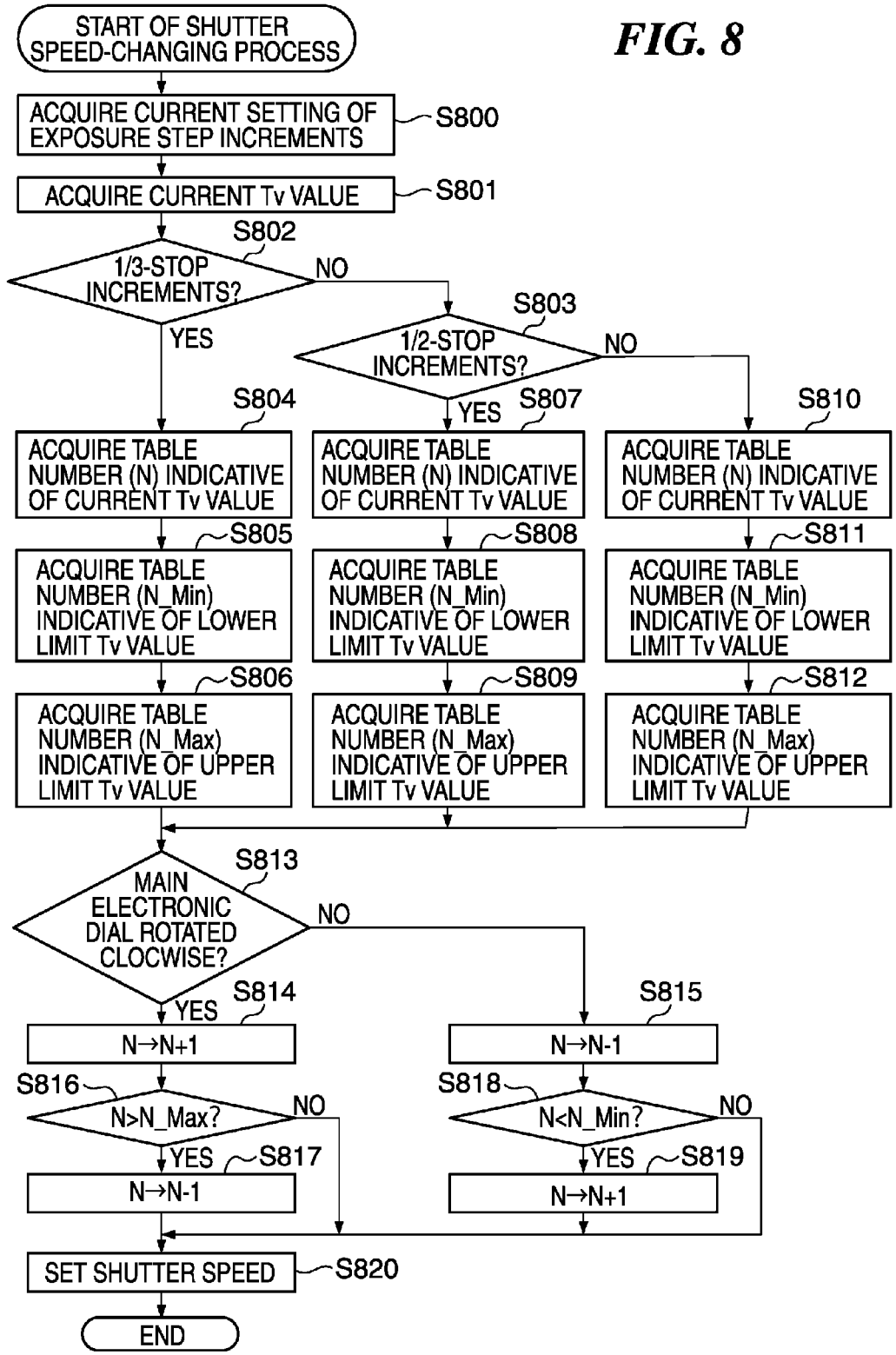
FIG. 8 is a flowchart of a shutter speed-changing process performed in a step in the shooting mode process.

FIG. 8 is a flowchart of the shutter speed-changing process performed in the step S308 or S328 in the shooting mode process in FIGS. 3A and 3B. The shutter speed-changing process in FIG. 8 is performed by the system controller 50 loading a program recorded in the nonvolatile memory 56 into the system memory 52 and executing the program. The shutter speed-changing process changes (provisionally sets) a shutter speed according to the operation of the main electronic dial 202.

When the shutter speed-changing process is started, the system controller 50 reads out and acquires the current setting of exposure step increments from the nonvolatile memory 56 (S800). Further, the system controller 50 reads out and acquires the set shutter speed (current Tv value) from the nonvolatile memory 56 (S801).

Then, the system controller 50 determines whether or not the current exposure step increments are ⅓-stop increments (S802). If the current exposure steps are not ⅓-stop increments (NO to the S802), the system controller 50 determines whether or not the current exposure step increments are ½-stop increments (S803). On the other hand, if the current exposure steps are ⅓-stop increments (YES to the S802), the system controller 50 obtains a table number (N) (number shown in the table) corresponding to the shutter speed read out in the step S801, from the table shown in FIG. 5A (S804).

Next, the system controller 50 obtains a table number (N_Min) corresponding to the minimum shutter speed which can be set in ⅓-stop increments from the table shown in FIG. 5A (S805). Further, the system controller 50 obtains a table number (N_Max) corresponding to the maximum shutter speed which can be set in ⅓-stop increments from the table shown in FIG. 5A (S806).

If it is determined in the step S803 that the current exposure step increments are ½-stop increments (YES to the step S803), the system controller 50 obtains a table number (N) corresponding to the shutter speed read out in the step S801, from the table shown in FIG. 5B (S807). Further, the system controller 50 obtains a table number corresponding to the minimum shutter speed (N_Min) which can be set in ½-stop increments from the table shown in FIG. 5B (S808). Further, the system controller 50 obtains a table number corresponding to the maximum shutter speed (N_Max) which can be set in ½-stop increments from the table shown in FIG. 5B (S809).

If the current exposure step increments are not ½-stop increments (NO to the step S803), the system controller 50 obtains a table number (N) corresponding to the shutter speed read out in the step S801, from the table shown in FIG. 5C (S810). Further, the system controller 50 obtains a table number corresponding to the minimum shutter speed (N_Min) which can be set in 1-stop increments, from the table shown in FIG. 5C (S811). Then, the system controller 50 obtains a table number (N_Max) corresponding to the maximum shutter speed which can be set in 1-stop increments, from the table shown in FIG. 5C (S812).

After performing the step S806, S809, or S812, the system controller 50 determines whether or not a direction of rotation of the main electronic dial 202 is a normal rotation direction (clockwise direction: right) (S813). If the direction of rotation of the main electronic dial 202 is the normal rotation direction (YES to the step S813), the system controller 50 increments the table number (N) to thereby set N=N+1 (S814). On the other hand, if the direction of rotation of the main electronic dial 202 is a reverse rotation direction (anticlockwise direction: left) (NO to the step S813), the system controller 50 decrements the table number (N) to thereby set N=N−1 (S815).

After performing the step S814, the system controller 50 determines whether or not the table number (N)>the maximum table number (N_Max) holds (S816). If the table number (N)>the maximum table number (N_Max) holds (YES to the S816), the system controller 50 decrements the table number (N) to thereby set N=N−1 (S817).

After performing the step S815, the system controller 50 determines whether or not the table number (N)<the minimum table number (N_Min) holds (S818). If the table number (N)<the minimum table number (N_Min) holds (YES to the S818), the system controller 50 increments the table number (N) to thereby set N=N+1 (S819).

After performing the step S817 or S819, the system controller 50 determines a shutter speed based on the table number (N) and one of the tables shown in FIGS. 5A to 5C, which is associated with the current setting of exposure step increments, and sets the determined shutter speed as a new shutter speed (S820). Then, the system controller 50 terminates the shutter speed-changing process. Note that after performing the step S819, the system controller 50 proceeds to the step S820.

If it is determined in the step S816 that the table number (N)≤the maximum table number (N_Max) holds (NO to the S816), the system controller 50 proceeds to the step S820. Further, if it is determined in the step S818 that the table number (N)≥the minimum table number (N_Min) holds (NO to the S818), the system controller 50 proceeds to the step S820.

By changing the shutter speed as described above, it is possible to set the shutter speed based on the current setting of exposure step increments set by the user.

As described above, in the first embodiment of the present invention, in the state in which the moving image live view is being displayed, the shutter speed is set according to the setting of exposure step increments. In this case, the shutter speed which is the reciprocal of the frame rate of the moving image can be set irrespective of exposure step increments. Further, in the state in which the moving image live view is not being displayed, the shutter speed is set according to the selected setting of exposure step increments. As a result, it is possible to set the shutter speed desired by the user irrespective of moving image shooting (moving image pickup) and still image shooting (still image pickup).

Next, a description will be given of a camera as an image pickup apparatus according to a second embodiment of the present invention. Note that the camera according to the second embodiment is the same in configuration as the camera shown in FIGS. 1, 2A, and 2B.

In the above-described first embodiment, even in the state in which the moving image live view is being displayed, the same step increments of the shutter speed as those of the shutter speed for shooting a still image are used. Further, in this case, only the long exposure-side limit value of the shutter speed is set to a value which does not conform to the setting of exposure step increments (the reciprocal of the frame rate or a value close to the reciprocal).

On the other hand, in the second embodiment, in the state in which the moving image live view is being displayed, the same step increments of the shutter speed as those of the shutter speed for shooting a still image are not used, as will be described hereinafter. Further, in the second embodiment, exposure step increments are used with which values of the shutter speed, including a value of the reciprocal of the frame rate or a value close thereto, can be set. For example, in the state in which the moving image live view is being displayed, values of the shutter speed in ¼-stop increments are used with which values of the shutter speed, including ¹⁄₂₅ seconds (the reciprocal of 25 fps and a value close to the reciprocal of 24 fps on a shorter exposure side) and ¹⁄₅₀ seconds (the reciprocal of 50 fps), can be set.

Note that in the state in which the moving image live view is being displayed, the shutter speed which can be set is a value which conforms to the setting of ¼-stop increments and is not larger than the reciprocal of the set frame rate of the moving image.

Figure 9A:
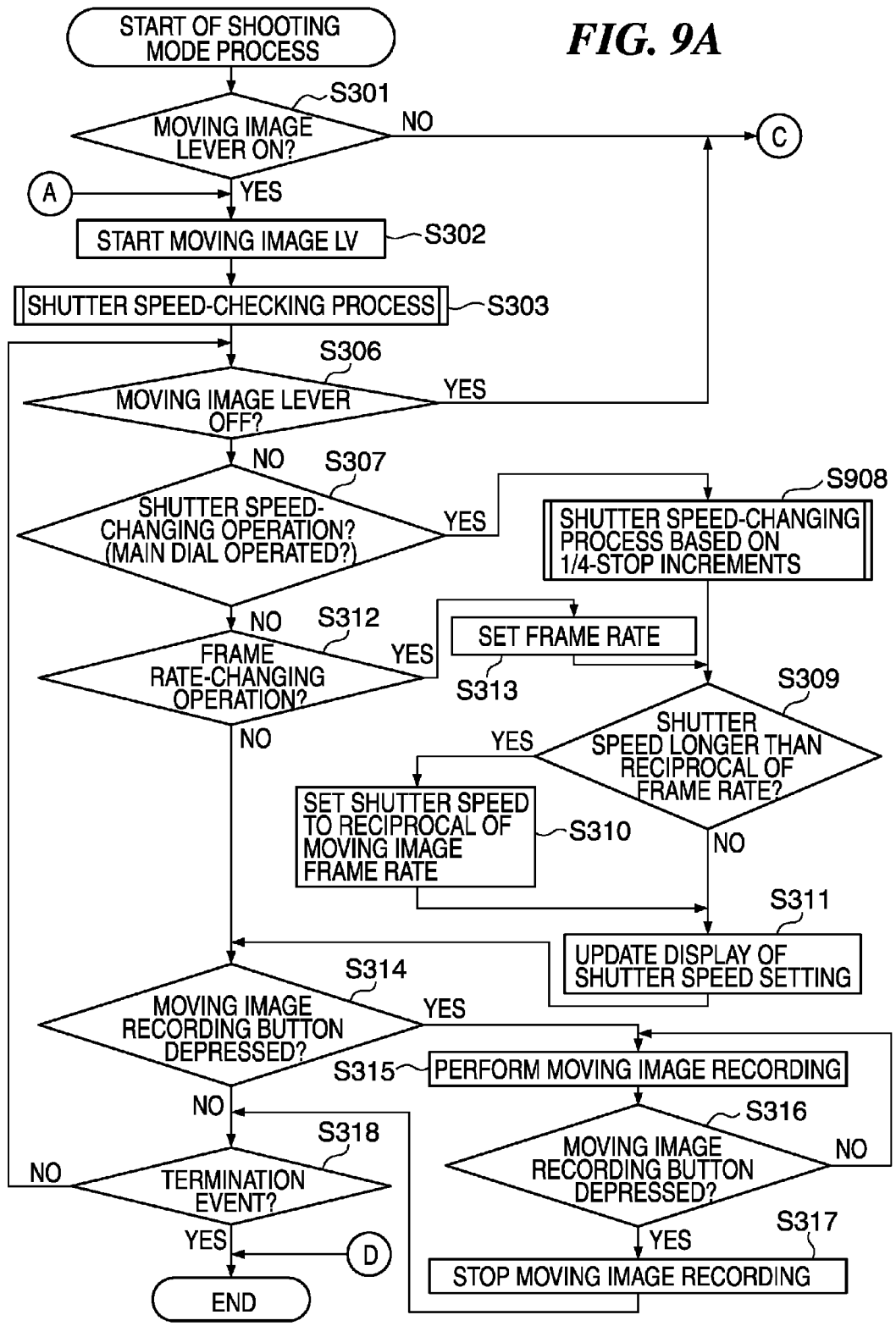
FIG. 9A is a flowchart of a shooting mode process performed by a digital camera as an image pickup apparatus according to a second embodiment of the present invention.
Figure 9B:
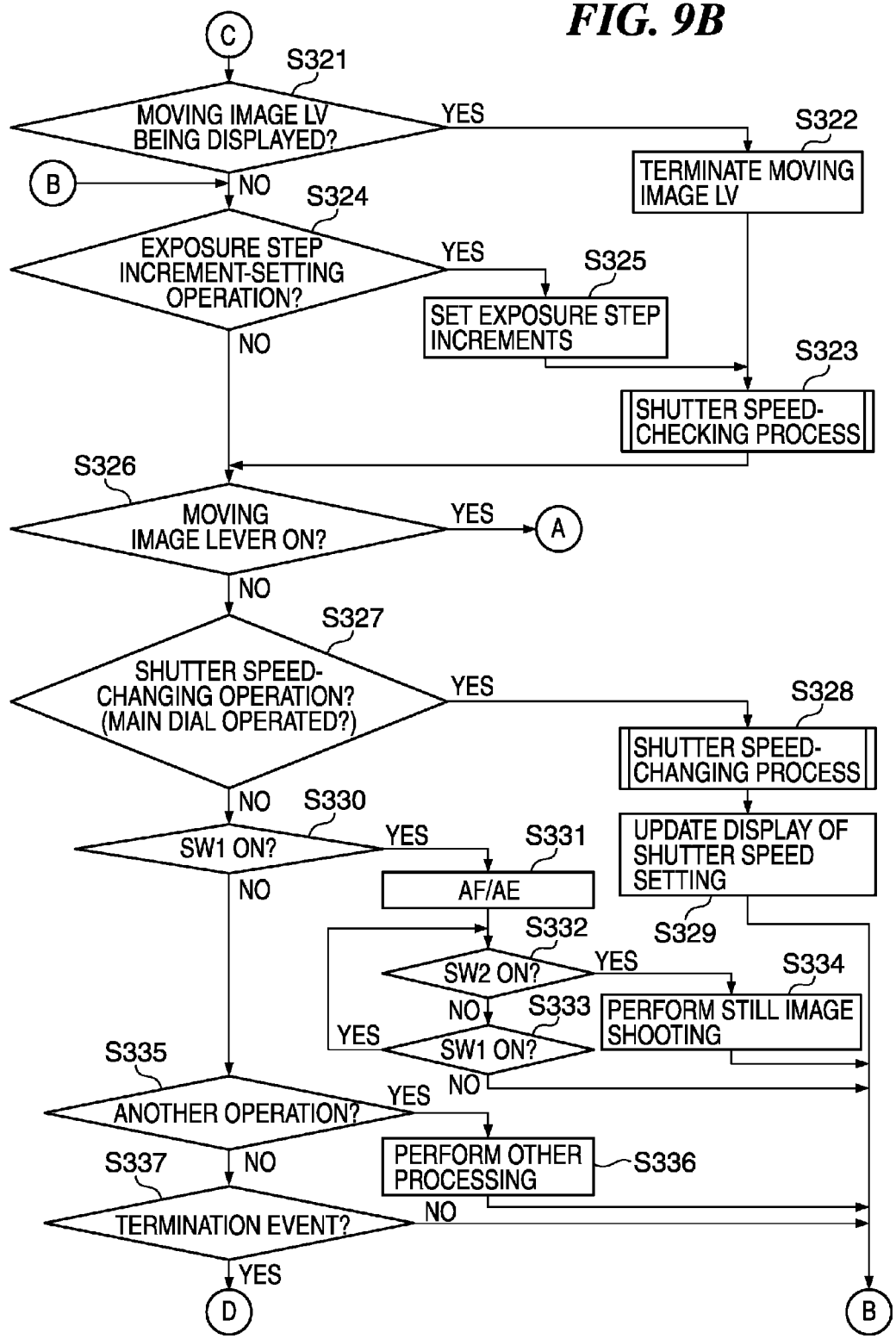
FIG. 9B is a continuation of FIG. 9A.

FIGS. 9A and 9B are a flowchart of a shooting mode process performed by the camera as the image pickup apparatus according to the second embodiment.

The shooting mode process in FIG. 9 is performed by the system controller 50 loading a program recorded in the nonvolatile memory 56 into the system memory 52 and executing the program. The same steps in FIGS. 9A and 9B as those in FIGS. 3A and 3B are denoted by the same step numbers, and description thereof is omitted.

After performing the shutter speed-checking process in the step S303, the system controller 50 proceeds to the step S306. That is, in the state in which the moving image live view is being displayed, the system controller 50 does not receive an operation for changing the setting of exposure step increments (steps S304 and S305 in FIG. 3A are not performed). As a consequence, in the state in which the moving image live view is being displayed, the system controller 50 sets the exposure step increments to ¼-stop increments, and does not use the other exposure steps.

If it is determined in the step S307 that the shutter speed-changing operation has been performed (YES to the step S307), the system controller 50 performs a shutter speed-changing process according to the setting of ¼-stop increments, as will be described hereinafter (S908). Then, the system controller 50 proceeds to the step S309.

Note that the shutter speed set in the step S310 is a value which conforms to the setting of ¼-stop increments and is the maximum of values not larger than the reciprocal of the set frame rate of the moving image. For example, when the frame rate is 24 fps, the shutter speed is set to ¹⁄₂₅ seconds.

Figure 10:
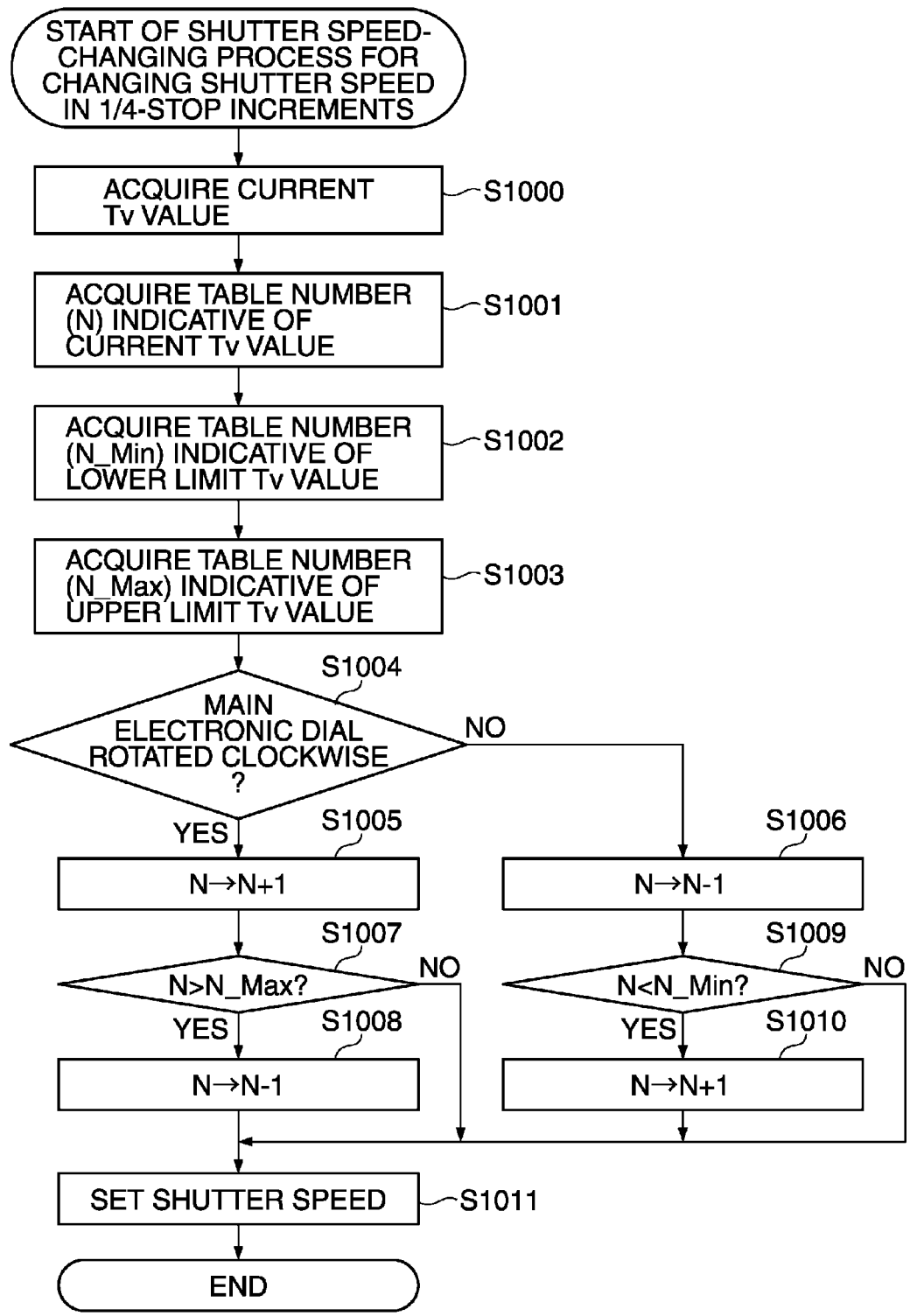
FIG. 10 is a flowchart of a shutter speed-changing process for changing the shutter speed in ¼-stop increments, which is performed in a step in the shooting mode process in FIG. 9A.

FIG. 10 is a flowchart of the shutter speed-changing process for changing the shutter speed in ¼-stop increments, which is performed in the step S908 in the shooting mode process shown in FIGS. 9A and 9B. The shutter speed-changing process in FIG. 10 is performed by the system controller 50 loading a program recorded in the nonvolatile memory 56 into the system memory 52 and executing the program.

When the shutter speed changing process based on the setting of ¼-stop increments is started, the system controller 50 reads out and acquires the set shutter speed (current Tv value) from the nonvolatile memory 56 (S1000).

FIG. 11 is a diagram showing an example of a table used for changing the shutter speed in ¼-stop increments. Note that the table shown in FIG. 11 is recorded in the nonvolatile memory 56 in advance.

Then, the system controller 50 obtains a table number (N) corresponding to the shutter speed read out in the step S1000, from the table shown in FIG. 11 (S1001). Then, the system controller 50 obtains a table number (N_Min) corresponding to the minimum shutter speed which can be set in ¼-stop increments, from the table shown in FIG. 11 (S1002). Further, the system controller 50 obtains a table number (N_Max) corresponding to the maximum shutter speed which can be set in ¼-stop increments, from the table shown in FIG. 11 (S1003).

Then, the system controller 50 determines whether or not a direction of rotation of the main electronic dial 202 is a normal rotation direction (clockwise direction) (S1004). If the direction of rotation of the main electronic dial 202 is the normal rotation direction (YES to the step S1004), the system controller 50 increments the table number (N) to thereby set N=N+1 (S1005).

On the other hand, if the direction of rotation of the main electronic dial 202 is a reverse rotation direction (anticlockwise direction) (NO to the step S1004), the system controller 50 decrements the table number (N) to thereby set N=N−1 (S1006).

After performing the step S1005, the system controller 50 determines whether or not the table number (N)>the maximum table number (N_Max) holds (S1007). If the table number (N)>the maximum table number (N_Max) holds (YES to the S1007), the system controller 50 decrements the table number (N) to thereby set N=N−1 (S1008).

After performing the step S1006, the system controller 50 determines whether or not the table number (N)<the minimum table number (N_Min) holds (S1009). If the table number (N)<the minimum table number (N_Min) holds (YES to the S1009), the system controller 50 increments the table number (N) to thereby set N=N+1 (S1010).

After performing the step S1008 or S1010, the system controller 50 determines a shutter speed based on the table number (N) and the table shown in FIG. 11, and sets the determined shutter speed as a new shutter speed (S1011). Then, the system controller 50 terminates the shutter speed-changing process.

If it is determined in the step S1007 that the table number (N)≤the maximum table number (N_Max) holds (NO to the S1007), the system controller 50 proceeds to the step S1011. Further, if it is determined in the step S1009 that the table number (N) 2 the minimum table number (N_Min) holds (NO to the S1009), the system controller 50 proceeds to the step S1011.

As described above, in the second embodiment, in the state in which the moving image live view is being displayed, the shutter speed is set in the ¼-stop increments without any exception. By setting the shutter speed as above, it is possible to set the shutter speed to the reciprocal of the frame rate or a value close to the reciprocal irrespective of the frame rate of the moving image. On the other hand, in the state in which the moving image live view is not being displayed, the shutter speed is set according to the setting of exposure step increments, set by the user. As a consequence, it is possible to set the shutter speed desired by the user, irrespective of moving image shooting and still image shooting.

As is clear from the above description, in the example shown in FIG. 1, the system controller 50 and the mode changing switch 60 function as a mode setting unit. Further, the operating section 70 and the system controller 50 function as an exposure step increment-setting unit, and the system controller 50 functions as a frame rate-setting unit, a shutter speed-setting unit, and a control unit.

Note that the control performed by the system controller 50 may be performed by one piece of hardware item, or the overall operation of the apparatus may be performed by a plurality of pieces of hardware which share processing operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Although in the above-described embodiments, the description is given of a case where the present invention is applied to the digital camera, by way of example, this is not limitative, but the present invention can be applied to any other electronic device, insofar as it has functions for shooting (picking up) a moving image and a still image. That is, the present invention can be applied to a personal computer, a PDA, a mobile telephone terminal, a portable image viewer, a portable game machine, and so forth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-152049 filed Jul. 31, 2015, which is hereby incorporated by reference herein in its entirety.

What is claimed is:

1. An image pickup apparatus comprising:
    a mode setting unit configured to set one of a plurality of image shooting modes including a moving image shooting mode and a still image shooting mode;
    an exposure step increment-setting unit configured to set a setting of exposure step increments with which values of a shutter speed can be set, to one of a plurality of settings of exposure step increments, according to a user's operation;
    a frame rate-setting unit configured to set a frame rate of a moving image to be shot in the moving image shooting mode;
    a shutter speed-setting unit configured to set a shutter speed based on the setting of exposure step increments set by said exposure step increment-setting unit; and
    a control unit configured to perform, in a case of the moving image shooting mode, control such that the shutter speed can be set to a value which is the reciprocal of the frame rate set by said frame rate-setting unit and does not conform to the setting of exposure step increments set by said exposure step increment-setting unit.

2. The image pickup apparatus according to claim 1, wherein in a case where the frame rate is changed by said frame rate-setting unit, when a set shutter speed is longer than the reciprocal of the changed frame rate, said control unit performs control such that the shutter speed is forcibly changed to a shutter speed which is the reciprocal of the changed frame rate, irrespective of the setting of exposure step increments.

3. The image pickup apparatus according to claim 1, wherein in the still image shooting mode, said control unit performs control such that the shutter speed is not set to a value which is the reciprocal of the frame rate set by said frame rate-setting unit and does not conform to the setting of exposure step increments set by said exposure step increment-setting unit.

4. The image pickup apparatus according to claim 1, wherein in a case where the shutter speed which is set when the image pickup apparatus is shifted from a moving image-recordable state to a moving image-unrecordable state is not equal to a value which can be set in the exposure step increments, said control unit performs control such that the shutter speed is forcibly changed to a value which can be set in the exposure step increments.

5. The image pickup apparatus according to claim 1, wherein when the image pickup apparatus is in the moving image-recordable state, said control unit sets the shutter speed in ¼ stop increments irrespective of the setting of exposure step increments.

6. The image pickup apparatus according to claim 5, wherein when the image pickup apparatus is in the moving image-unrecordable state, said control unit sets the shutter speed according to the setting of exposure step increments.

7. The image pickup apparatus according to claim 1, wherein said exposure step increment-setting unit can set one of ⅓-stop, ½-stop, and 1-stop increments.

8. An image pickup apparatus comprising:
a mode setting unit configured to set one of a plurality of image shooting modes including a moving image shooting mode and a still image shooting mode;
an exposure step increment-setting unit configured to set a setting of exposure step increments with which values of a shutter speed can be set, to one of a plurality of settings of exposure step increments, according to a user's operation;
a frame rate-setting unit configured to set a frame rate of a moving image to be shot in the moving image shooting mode; and
a shutter speed-setting unit configured to set, in a case of the still image shooting mode, the shutter speed based on the setting of exposure step increments set by said exposure step increment-setting unit, and in a case of the moving image shooting mode, the shutter speed not based on the setting of exposure step increments set by said exposure step increment-setting unit, but based on a setting of exposure step increments with which values of the shutter speed, including a value of the reciprocal of the frame rate set by said frame rate-setting unit, can be set.

9. A method of controlling an image pickup apparatus, comprising:
setting one of a plurality of image shooting modes including a moving image shooting mode and a still image shooting mode;
setting a setting of exposure step increments with which values of a shutter speed can be set, to one of a plurality of settings of exposure step increments, according to a user's operation;
setting a frame rate of a moving image to be shot in the moving image shooting mode;
setting a shutter speed based on the set setting of exposure step increments; and
performing, in a case of the moving image shooting mode, control such that the shutter speed can be set to a value which is the reciprocal of the set frame rate and does not conform to the set setting of exposure step increments.

10. A method of controlling an image pickup apparatus, comprising:
setting one of a plurality of image shooting modes including a moving image shooting mode and a still image shooting mode;
setting a setting of exposure step increments with which values of a shutter speed can be set, to one of a plurality of settings of exposure step increments, according to a user's operation;
setting a frame rate of a moving image to be shot in the moving image shooting mode; and
setting, in a case of the still image shooting mode, the shutter speed based on the set setting of exposure step increments, and in a case of the moving image shooting mode, the shutter speed not based on the set setting of exposure step increments, but based on a setting of exposure step increments with which values of the shutter speed, including a value of the reciprocal of the set frame rate, can be set.

11. A non-transitory computer-readable storage medium storing a computer-executable program for executing a method of controlling an image pickup apparatus,
wherein the method comprises:
setting one of a plurality of image shooting modes including a moving image shooting mode and a still image shooting mode;
setting a setting of exposure step increments with which values of a shutter speed can be set, to one of a plurality of settings of exposure step increments, according to a user's operation;
setting a frame rate of a moving image to be shot in the moving image shooting mode;
setting a shutter speed based on the set setting of exposure step increments; and
performing, in a case of the moving image shooting mode, control such that the shutter speed can be set to a value which is the reciprocal of the set frame rate and does not conform to the set setting of exposure step increments.

12. A non-transitory computer-readable storage medium storing a computer-executable program for executing a method of controlling an image pickup apparatus,
wherein the method comprises:
setting one of a plurality of image shooting modes including a moving image shooting mode and a still image shooting mode;
setting a setting of exposure step increments with which values of a shutter speed can be set, to one of a plurality of settings of exposure step increments, according to a user's operation;
setting a frame rate of a moving image to be shot in the moving image shooting mode; and
setting, in a case of the still image shooting mode, the shutter speed based on the set setting of exposure step increments, and in a case of the moving image shooting mode, the shutter speed not based on the set setting of exposure step increments, but based on a setting of exposure step increments with which values of the shutter speed, including a value of the reciprocal of the set frame rate, can be set.

* * * * *